US011281271B2

(12) United States Patent
Aoki

(10) Patent No.: US 11,281,271 B2
(45) Date of Patent: Mar. 22, 2022

(54) CONTROLLER, CONTROL METHOD, AND CONTROL PROGRAM

(71) Applicant: RENESAS ELECTRONICS CORPORATION, Tokyo (JP)

(72) Inventor: Dan Aoki, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 32 days.

(21) Appl. No.: 16/596,033

(22) Filed: Oct. 8, 2019

(65) Prior Publication Data

US 2020/0174538 A1    Jun. 4, 2020

(30) Foreign Application Priority Data

Nov. 29, 2018    (JP) .............................. JP2018-223029

(51) Int. Cl.
*G06F 1/26* (2006.01)
*G06F 13/42* (2006.01)

(52) U.S. Cl.
CPC .......... *G06F 1/266* (2013.01); *G06F 13/4282* (2013.01); *G06F 2213/0042* (2013.01)

(58) Field of Classification Search
CPC . G06F 1/266; G06F 1/28; G06F 13/14; G06F 13/20; G06F 13/4068; G06F 13/4282; G06F 2213/0042
See application file for complete search history.

(56) References Cited

U.S. PATENT DOCUMENTS

| 10,122,576 | B2* | 11/2018 | Bhesania | .............. | H04W 84/20 |
| 10,437,752 | B2* | 10/2019 | Xu | ....................... | G06F 13/4068 |
| 2018/0018934 | A1* | 1/2018 | Lim | ................... | H01R 13/6683 |
| 2018/0074564 | A1* | 3/2018 | Paparrizos | ............. | H02M 7/04 |
| 2018/0356873 | A1* | 12/2018 | Regupathy | ............ | G06F 1/3287 |
| 2019/0129872 | A1* | 5/2019 | Xu | ....................... | G06F 13/4068 |
| 2020/0033924 | A1* | 1/2020 | Waters | ................ | G06F 13/4068 |

FOREIGN PATENT DOCUMENTS

WO    WO-2017152424 A1 *    9/2017    ......... G06F 13/4282

OTHER PUBLICATIONS

"TUSB322I USB Type-C™ Configuration Channel Logic and Port Control with VCONN" Texas Instruments, Inc. May 2017. (Year: 2017).*

(Continued)

*Primary Examiner* — Thomas J. Cleary
(74) *Attorney, Agent, or Firm* — McDermott Will & Emery LLP

(57) ABSTRACT

The present invention solves a new problem that may occur when Try.SRC or Try.SNK is adopted. A controller is used to implement a DRP-compliant device that can be both power supply side and power reception side according to the USB Type-C standard. The controller is configured to be able to execute a first process of determining whether or not the Port Power Role of the opposing device is Try.SRC when the Power Role of the own device is determined to be Sink meaning the power receiver according to the sequence with the opposing device, which is the connected device, and a second process of switching the Port Power Role of the own device to SRC only and continuing the sequence with the opposing device if the Port Power Role of the opposing device is Try.SRC.

8 Claims, 20 Drawing Sheets

(56) References Cited

OTHER PUBLICATIONS

"Universal Serial Bus Type-C Cable and Connector Specification", Release 1.3, Jul. 14, 2017.
"Universal Serial Bus Type-C (USB Type-C) Functional Test Specification", Revision:0.79, May 28, 2018.
"Universal Serial Bus Power Delivery Specification", Revision:3.0, Version:1.2, Jun. 21, 2018.

* cited by examiner

FIG. 2

| Port Power Role of own device | Port Power Role of opposing device | Power Role of own device after connection |
|---|---|---|
| Try.SRC | SRC only | SNK |
| Try.SRC | Try.SRC | SRC or SNK |
| Try.SRC | DRP | SRC |
| Try.SRC | Try.SNK | SRC |
| Try.SRC | SNK only | SRC |
| Try.SNK | SRC only | SNK |
| Try.SNK | Try.SRC | SNK |
| Try.SNK | DRP | SNK |
| Try.SNK | Try.SNK | SRC or SNK |
| Try.SNK | SNK only | SRC |

FIG. 5

| Port Power Role of own device | Port Power Role of opposing device | Power Role of own device after connection |
|---|---|---|
| Try.SRC → SRC only | SRC only | SNK |
| | Try.SRC | SRC |
| | DRP | SRC |
| | Try.SNK | SRC |
| | SNK only | SRC |

FIG. 17

| Port Power Role of own device | Port Power Role of opposing device | Power Role of own device after connection |
|---|---|---|
| Try.SNK → SNK only | SRC only | SNK |
| Try.SNK → SNK only | Try.SRC | SNK |
| Try.SNK → SNK only | DRP | SNK |
| Try.SNK → SNK only | Try.SNK | SNK |
| Try.SNK → SNK only | SNK only | SRC |

CONTROLLER, CONTROL METHOD, AND CONTROL PROGRAM

CROSS-REFERENCE TO RELATED APPLICATIONS

The disclosure of Japanese Patent Application No. 2018-223029 filed on Nov. 29, 2018 including the specification, drawings and abstract is incorporated herein by reference in its entirety.

BACKGROUND

The present disclosure relates to controllers is, for example, used to execute sequences in accordance with the Universal Serial Bus standard to execute a power supplying and receiving operation with respect to a connection destination.

As a USB standard, a USB Type-C standard is defined, and a USB Type-C interface conforming to the USB Type-C standard is becoming popular (for example, see "Universal Serial Bus Type-C Cable and Connector Specification", Release 1.3, Jul. 14, 2017). In the USB Type-C interface, a port having a same shape is used for power supply and power reception. Therefore, a single port supports both power supply and power reception.

In the USB Type-C standard, a device supplying an electric power (power supply side) is referred to as "Source" or "SRC", and a device receiving a electric power (power reception side) is referred to as "Sink" or "SNK". Furthermore, a device corresponding to both power supply and power reception is referred to as "DRP (Dual Role Power)". By using DRP, you can replace two ports that were previously needed separately with one port and reduce costs and space.

Because of this advantage, it is anticipated that DRP will be employed as Port Power Role so that when USB Type-C interfaces are employed in mobile devices such as smartphones, tablets, laptops, and the like, including Power Bank such as mobile batteries, DRP will be able to support both power supply and power reception at one port.

SUMMARY

When devices having DRPs as Port Power Role are connected to each other, the Power Role (i.e., which device will be SRC/SNK) is not uniquely determined. Therefore, in the USB Type-C standard disclosed in "Universal Serial Bus Type-C Cable and Connector Specification", Release 1.3, Jul. 14, 2017, "Try.SRC" (DRP oriented toward SRC) and "Try.SNK" (DRP oriented toward SNK) are defined as Port Power Role.

For example, when Try.SRC (DRP oriented toward SRC) and DRP (pure DRP) are connected, the device on Try.SRC side becomes SRC. Similarly, when Try.SNK (DRP oriented toward SNK) and DRP (pure DRP) are connected, the device on Try.SNK side becomes SNK.

The inventor of the present application has found that a new problem can occur when such Try.SRC or Try.SNK is employed.

Other objects and novel features will become apparent from the description of this specification and the accompanying drawings.

A controller in accordance with an embodiment is used to implement a DRP-compliant device that can be both power supply side and power reception side in accordance with the USB Type-C standard. The controller is configured to be able to execute a first processing of determining whether or not the Port Power Role of the opposing device is Try.SRC when the Power Role of the own device is determined to be Sink meaning power reception side according to the sequence with the opposing device, which is the device of the connection destination, and if the Port Power Role of the opposing device is Try.SRC, a second processing of switching the Port Power Role of the own device to SRC only and continuing the sequence with the opposing device.

According to an embodiment, a new problem that may occur when Try.SRC or Try.SNK is employed can be solved.

BRIEF DESCRIPTION OF THE DRAWINGS

FIG. 2 shows examples of Power Role decisions concerning device connections in accordance with USB Type-C standard.

FIG. 5 is a diagram illustrating decision examples of Power Role in a device according to the first embodiment;

FIG. 17 is a diagram showing decision examples of Power Role in a device according to the fifth Embodiment;

DETAILED DESCRIPTION

Detailed Description of the Invention

Figure 1A:
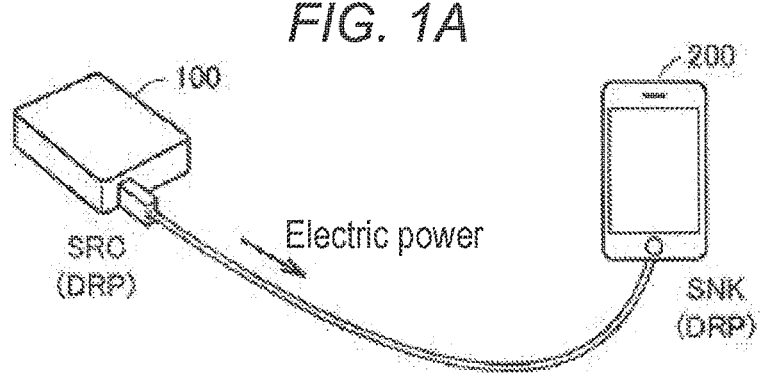
FIGS. 1A-1C show diagrams for explaining examples of determining Power Role according to a USB Type-C standard.

The same or corresponding portions in the drawings are denoted by the same reference numerals, and description thereof will not be repeated.

A. Background

First, the Power Role in the USB Type-C standard will be described.

In the USB Type-C standard, "Source" or "SRC", which is a device that supplies electric power (power supply side), and "Sink" or "SNK", which is a device that receives electric power (power reception side), as well as "DRP", which is a device that supports both power supply and power reception, are specified.

When devices configured as DRPs are connected, the Power Role (i.e., which device is SRC/SNK) is not uniquely determined. Therefore, in the USB Type-C standard, "Try.SRC" (DRP oriented toward SRC) and "Try.SNK" (DRP oriented toward SNK) are defined.

Figure 1B:
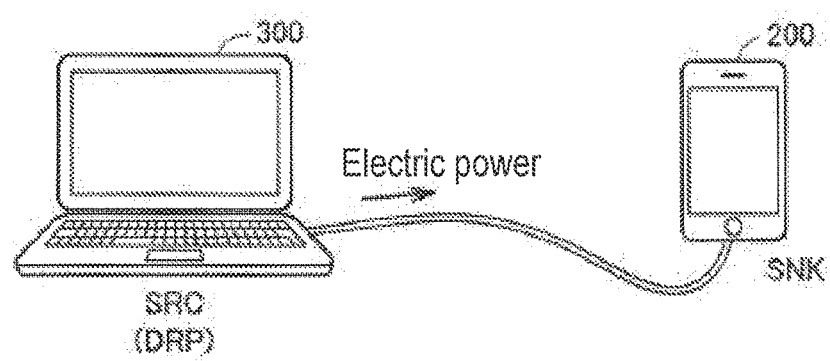
Figure 1C:
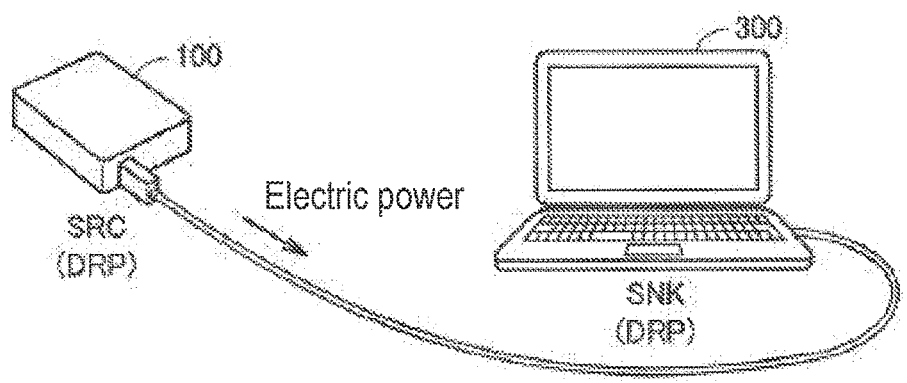

FIGS. 1A-1C are a diagram for explaining an example which determines Power Role according to the USB Type-C standard. FIGS. 1A-1C show a Power Bank 100, a smart phone 200, and a laptop computer 300. Each of these devices is configured as DRP.

As shown in FIG. 1A, when the Power Bank 100 and the smartphone 200 are connected to each other, electric power is normally scheduled to be supplied from the Power Bank 100 to the smartphone 200. That is, it is preferable that the Power Bank 100 is SRC and the smartphone 200 is SNK.

Further, as shown in FIG. 1B, when the laptop computer 300 and the smartphone 200 are connected to each other, considering that the laptop computer 300 is equipped with a larger battery, the electric power is scheduled to be supplied from the laptop computer 300 to the smartphone 200. That is, it is preferable that the laptop computer 300 is SRC and the smartphone 200 is SNK.

Assuming the use mode as shown in FIG. 1A and FIG. 1B, it is preferable that both the Power Bank 100 and the laptop computer 300 are configured as Try.SRC, and the smartphone 200 is configured as Try.SNK.

Here, as shown in FIG. 1C, it is assumed that the Power Bank 100 and the laptop computer 300 are connected to each other. In this instance, it is expected that electric power will normally be supplied from the Power Bank 100 to the laptop computer 300. Therefore, it is preferable that the Power Bank 100 is SRC and the laptop computer 300 is SNK.

However, a new problem has been found that when the Power Bank 100 and laptop computer 300 are configured as Try.SRC assuming the use mode as shown in FIGS. 1A and 1B, the Power Role between the Power Bank 100 and the laptop computer 300 is not uniquely determined.

That is, when Try.SRCs are connected, the Power Role (i.e., which of the devices will be SRC/SNK) is not uniquely determined. Similarly, when Try.SNK are connected, the Power Role (i.e., which devices will be SRC/SNK) is not uniquely determined.

FIG. 2 is a diagram illustrating decision examples of Power Role for connecting devices according to the USB Type-C standard. As shown in FIG. 2, five types of Port Power Role indicating the roles set in the devices are "SRC only", "Try.SRC", "DRP", "Try.SNK", and "SNK only". There are two types of Power Role indicating the roles of the ports of the devices in the connected states, "SNK" and "SRC".

The Port Power Role and the Power Role are set independently for each of the ports included in the devices. For convenience of description, the following description focuses on a single port of each device.

Referring to FIG. 2, when the Port Power Role of the own device is Try.SRC, the Power Role of the own device after connection is not uniquely determined if the Port Power Role of the opposing device, which is the device of the connection destination, is Try.SRC.

Similarly, when the Port Power Role of the own device is Try.SNK, the Power Role of the own device after connection is not uniquely determined if the Port Power Role of the opposing device is Try.SNK.

According to each embodiment of the present disclosure, a solution to the new problem that such a Power Role is not uniquely determined is provided.

B. Example of Hardware Configuration

First, a hardware configuration example of a controller according to each embodiment of the present invention will be described. Each of the embodiments described later can be realized by using a controller as described below. For convenience of explanation, an example of the hardware configuration in the Power Bank 100 will be described, but for other devices, a similar hardware configuration can be adopted.

Figure 3:
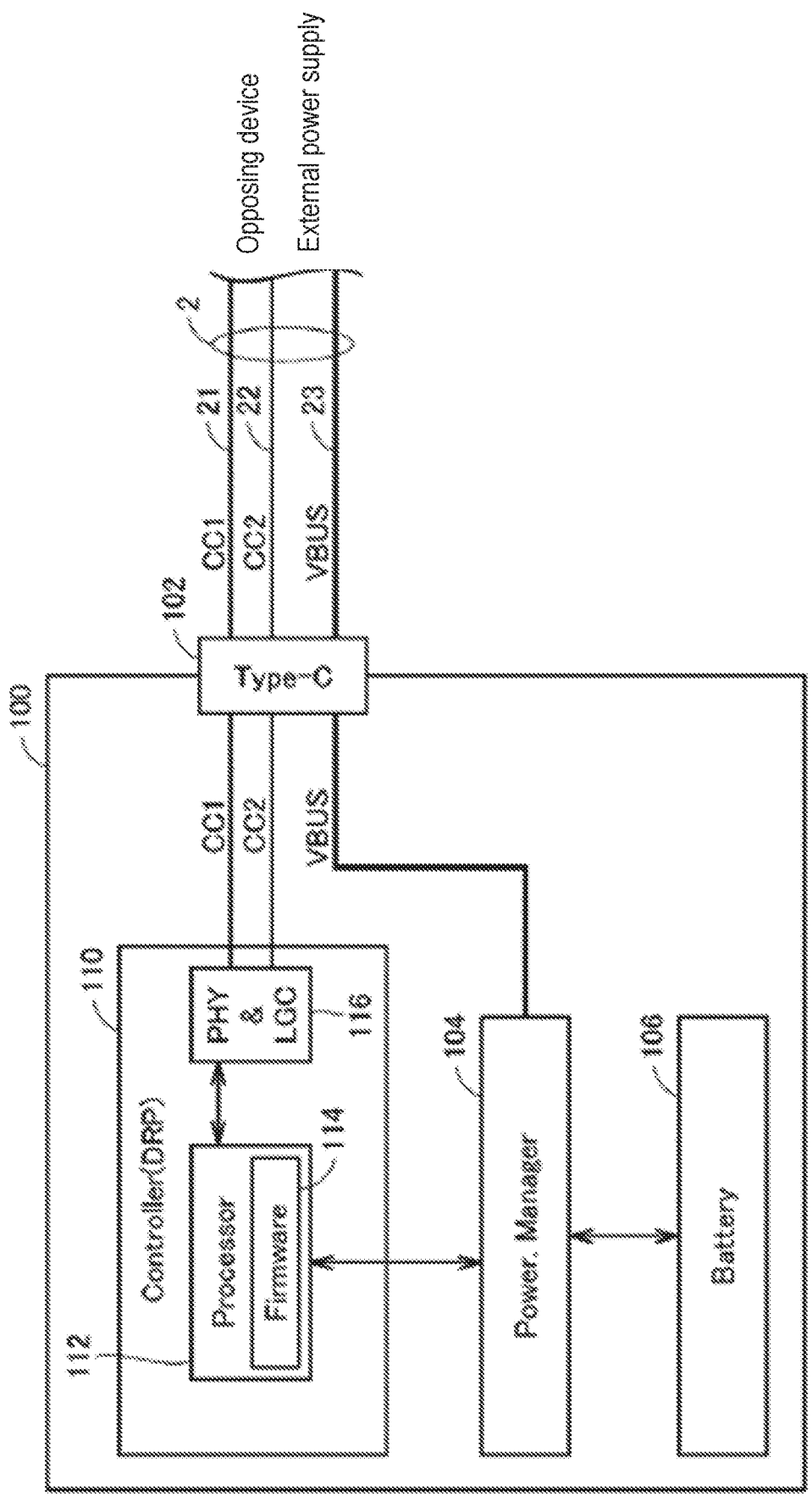
FIG. 3 is a schematic diagram showing an example of a Power Bank hardware configuration in accordance with embodiments of the present invention.

FIG. 3 is a schematic diagram showing an example of a hardware configuration in the Power Bank 100 according to each of embodiments in the present disclosure. Referring to FIG. 3, the Power Bank 100 includes, as main components, a connector 102, a power supply manager (Power Manager) 104, a battery 106, and a controller (Controller) 110. The connector 102 includes ports for the USB Type-C interface.

The power manager 104 controls charging and discharging of the battery 106 in accordance with instructions from the controller 110. Specifically, the power manager 104 is capable of selectively performing a first charging operation of storing electric power supplied from an external power supply in the battery 106, a second charging operation of storing electric power supplied from an external device in the battery 106, and a discharging operation of supplying electric power stored in the battery 106 to an external device.

The battery 106 is a storage battery configured to be chargeable and dischargeable, and for example, a lithium ion secondary battery, a lithium ion polymer secondary battery, a nickel-hydrogen rechargeable battery, or the like is used.

The controller 110 implements DRP-compliant devices that can be both power supply side (SRC) and power reception side (SNK) in accordance with the USB Type-C standard. The controller 110 provides a port that functions as DRP and manages communication and power supplying and receiving operation with the opposing device via a USB cable 2 by executing a control method as described below. More specifically, the controller 110 includes a processor 112 and a CC1/CC2 control and connection detection module (PHYs & LGC) 116. The processor 112 is connected to the CC1/CC2 control and connection detection module 116 and the power manager 104.

The processor 112 executes sequences according to the USB Type-C standard. The processor 112 executes a firmware 114, which is an example of a control program, thereby realizing an execution of a control method and a provision of a function as described below. That is, the sequence (control procedure) relating to a state control according to the USB Type-C standard may be realized by the processor 112 executing the firmware 114, which is an example of the control program. Implementation using the processor 112 and the firmware 114 can facilitate sequence modification, version upgrade, and the like. Instead of the software implementation using the processor 112, a hardware implementation as described later may be adopted.

The CC1/CC2 control and connection detection module 116 controls the communication lines (a first communication line (CC1) 21 and a second communication line (CC2) 22) in the USB cable 2 to detect the opposing device and connection, according to instructions from the processor 112. The first communication line 21 and the second communication line 22 may be collectively referred to as a "communication line". The detailed configuration of the CC1/CC2 control and connection detection module 116 will be described later.

The processor 112 is coupled to the power manager 104 for controlling the charging and discharging of the battery 106. An optional control interface may be provided between the processor 112 and the power manager 104. Such a control interface mediates a sending of a control command for controlling the charging and discharging by the power manager 104 in accordance with an instruction from the processor 112. For example, a control signal may be exchanged between the processor 112 and the power manager 104 in accordance with an I2C interface.

Electric power is exchanged between the battery 106 and the external device via an electric power line (VBUS) 23 in the USB cable 2. The USB cable 2 may include a shield wire (not shown).

Figure 4:
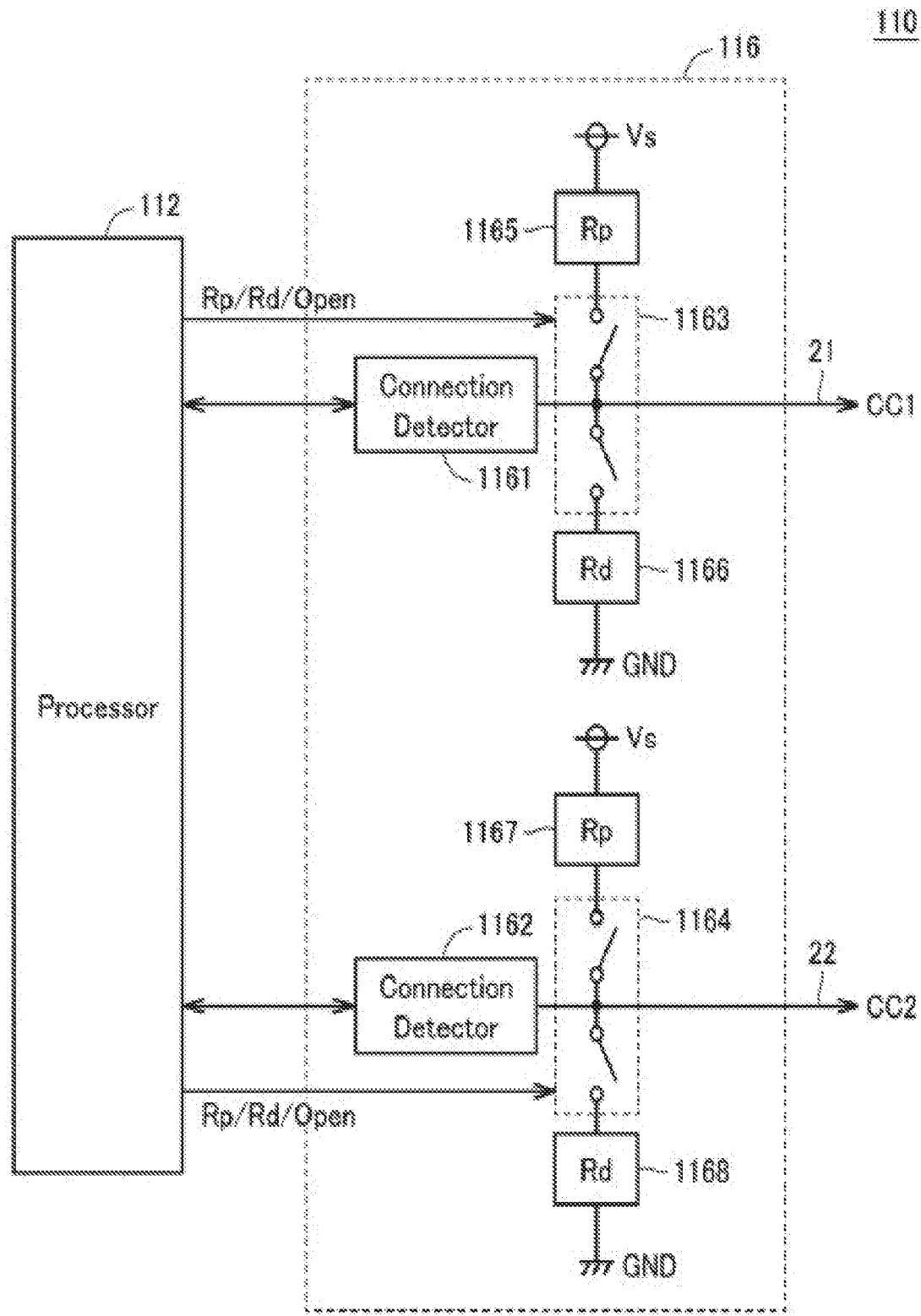
FIG. 4 is a schematic diagram showing an example of a circuit configuration of a controller 110 shown in FIG. 3.

FIG. 4 is a schematic diagram showing an example of the circuit configuration of the controller 110 shown in FIG. 3. Referring to FIG. 4, the CC1/CC2 control and connection detection module 116 of the controller 110 controls the first communication line 21 (CC1) and the second communication line 22 (CC2) to detect a connection with an opposing device.

More specifically, the CC1/CC2 control and connection detection module 116 includes a first connection detector 1161 and a second connection detector 1162.

The first connection detector 1161 detects a connection status of the opposing device based on a potential of the first communication line 21, and outputs the detection result to the processor 112. Similarly, the second connection detector 1162 detects a connection status of the opposing device by a potential of the second communication line 22, and outputs the detection result to the processor 112.

The CC1/CC2 control and connection detection module 116 has resistors connected between the communication lines (the first communication line 21 and the second communication line 22) and a power supply potential Vs and a ground potential GND, respectively, in order to detect the connection of the opposing device.

Specifically, a pull-up resistor 1165 having a resistance value Rp between the first communication line 21 and the power supply potential Vs is connected to the first communication line 21, and a pull-down resistor 1166 having a resistance value Rd between the first communication line 21 and the ground potential GND is connected to the first communication line 21. Similarly, a pull-up resistor 1167 having a resistance value Rp between the second communication line 22 and the power supply potential Vs is connected to the second communication line 22, and a pull-down resistor 1168 having a resistance value Rd between the second communication line 22 and the ground potential GND is connected to the second communication line 22.

Switches 1163 and 1164 electrically connect/disconnect paths leading from the communication lines (the first communication line 21 and the second communication line 22) to the power supply potential Vs and the ground potential GND. More specifically, the switch 1163 electrically connects/disconnects the pull-up resistor 1165 or the pull-down resistor 1166 to/from the first communication line 21 in accordance with a control signal from the processor 112. Similarly, the switch 1164 electrically connects/disconnects the pull-up resistor 1167 or the pull-down resistor 1168 to/from the second communication line 22 in accordance with a control signal from the processor 112.

By detecting the voltages corresponding to the resistances Rp and Rd generated in the first communication line 21 and the second communication line 22, the connection between the Power Bank 100 and the opposing device is established to each other.

C. First Embodiment

Next, as the first embodiment, sequences in which the Power Role of the Power Bank 100 can be uniquely determined as SRC in the situation as shown in FIG. 1C will be exemplified.

More specifically, the device according to the first embodiment dynamically switches the Port Power Role to SRC only when Try.SRC is set as the initial-state Port Power Role and after connection, the Power Role must be fixed to the (when a predetermined switching condition SR is satisfied). By dynamically switching such a Port Power Role, even when devices whose Port Power Role is Try.SRC are connected to each other, a predetermined device can be fixed to SRC.

[c1: Decision Example of Power Role]

FIG. 5 is a diagram showing an example of determining a Power Role in the device according to the first embodiment. Referring to FIG. 5, it is assumed that in the initial state, the Port Power Role of the own device is Try.SRC. If the Port Power Role of the opposing device is Try.SRC, the Port Power Role of the own device is switched from Try.SRC to SRC only. This uniquely makes the Power Role of the own device determined to SRC.

As the switching condition SR for switching the Port Power Role from Try.SRC to SRC only as described above, in the first embodiment, the state transition path at the time of connecting to the opposing device is used. More specifically, when the own to device connects with the opposing device and the Power Role of the own device is SNK, if it is determined that the Port Power Role of the opposing device is Try.SRC, the Port Power Role of the own device is switched to SRC only and reconnected. When it is detected that the connection with the opposing device is disconnected, the Port Power Role of the opposing device is returned to Try.SRC again.

As described above, according to the first embodiment, the device executes the process of determining whether or not the Port Power Role of the opposing device is Try.SRC when the Power Role of the own device is determined to be SNK, which means the power reception side, in accordance with the sequence with the opposing device, which is the device of the connection destination. Then, if the Port Power Role of the opposing device is Try.SRC, according to the first embodiment, the device performs a process of switching the Port Power Role of the own device to SRC only and continuing the sequencing with the opposing device.

By dynamically switching the Port Power Role, even if the Port Power Role of the opposing device is Try.SRC, after connection, the Power Role of the own device can be fixed to SRC.

(c2: State Machine)

Figure 6:
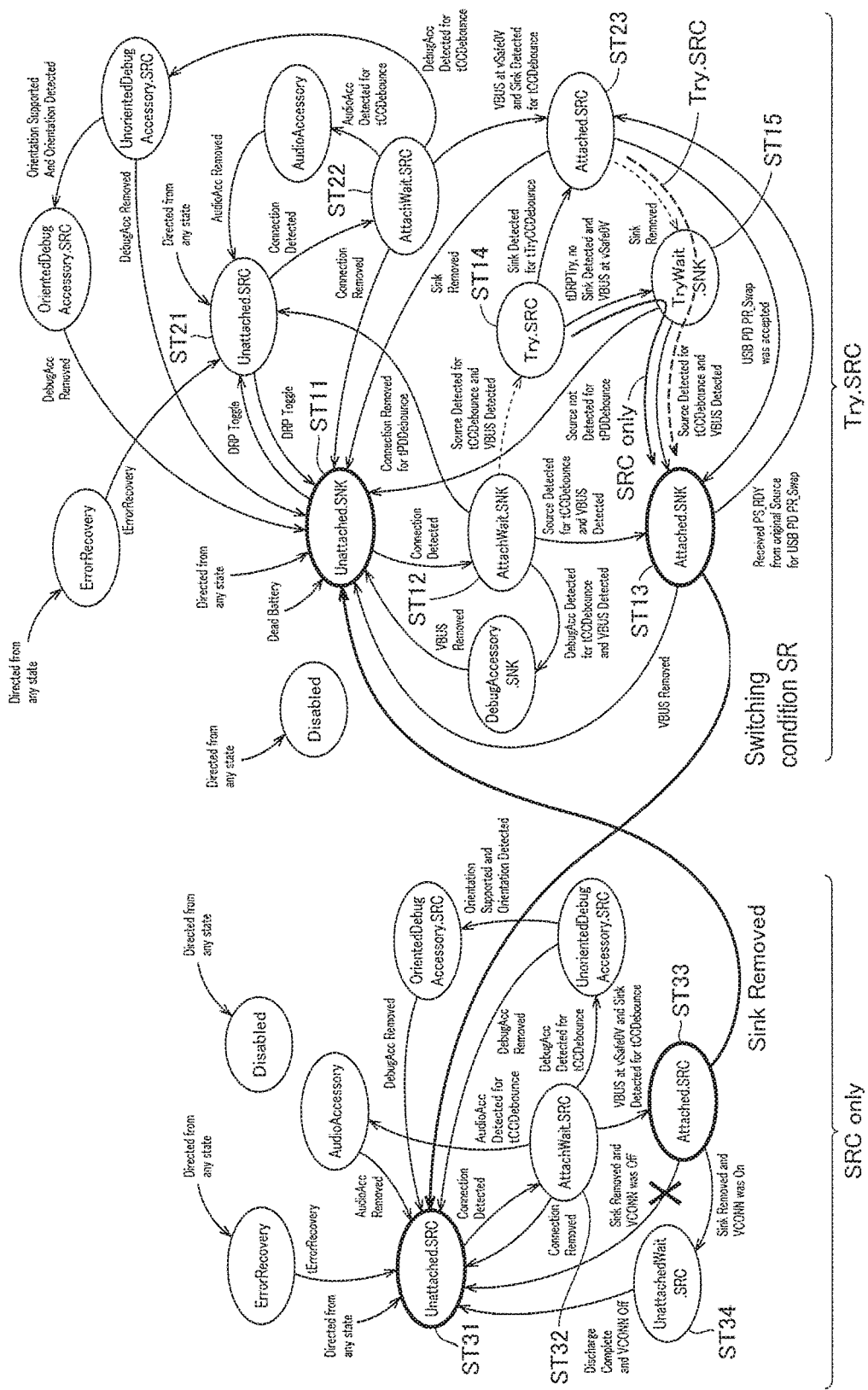
FIG. 6 is a diagram illustrating an example of a state machine of a device according to the first embodiment.

FIG. 6 illustrates an example of a state machine of a device according to the first embodiment. Referring to FIG. 6, according to the first embodiment, the device will have both Try.SRC and SRC only state machines.

In the initial state, since the Port Power Role is Try.SRC, the operation is started in the state machine of Try.SRC. When the switching condition SR is satisfied by the transition of the state machine, the operation is transitioned to the state machine of SRC only.

In the operation of SRC only, when it is detected that the connection with the opposing device is disconnected (Sink Removed), the state machine returns to the state machine of Try.SRC instead of transitioning to Unattached.SRC (ST31). That is, the state returns the Port Power Role to Try.SRC and the device returns to the initialization.

In the state machine shown in FIG. 6, the direct transition from Attached.SRC (ST33) to the Unattached.SNK (ST11) is performed when SRC only returns to Try.SRC, but the transition from Attached.SRC (ST33) to Unattached.SNK (ST11) may be performed via UnattachedWait.SRC (ST34).

(c3: Switching Condition SR)

Next, the switching condition SR for switching the Port Power Role from Try.SRC to SRC only is explained. As the switching condition SR, a state transition path leading to Attached.SNK (ST13) is used. That is, the process of determining the Port Power Role of the opposing device includes a process of determining whether or not the Port Power Role of the opposing device is Try.SRC based on the state transition path until the Power Role of the own device is determined to be Sink.

The Attached.SNK (ST13) corresponds to a state in which the Power Role of the device becomes SNK, but here, if the opposing device is SRC only, the operation follows the definition of FIG. 5, but if the opposing device is not SRC only, but Try.SRC, the operation does not follow the definition of FIG. 5, and the Power Role of the device needs to be switched to SRC.

That is, according to the first embodiment, the controller 110 of the device switches the Port Power Role of the own device to SRC only, when the Port Power Role of the opposing device is not SRC only.

More specifically, when the own device transitions to Attached.SNK (ST13), the Port Power Role of the opposing device is SRC only, or Try.SRC. Therefore, after the own device transitions to Attached.SNK (ST13), it is determined whether the Port Power Role of the opposing device is SRC only, or Try.SRC.

As shown in FIG. 6, when the Port Power Role of the opposing device is SRC only, state transition paths of Try.SRC (ST14), TryWait.SNK (ST15), and Attached.SNK (ST13) are taken. On the other hand, when the Port Power Role of the opposing device is Try.SRC, state transition paths of Attached.SRC (ST23), TryWait.SNK (ST15), and Attached.SNK (ST13) are taken.

The switching condition SR indicating whether or not the Port Power Role of the own device should be switched SRC only can be determined on the basis of the difference between the state transition paths leading to Attached.SNK (ST13). That is, when state transition paths of Attached.SRC (ST23), TryWait.SNK (ST15), and Attached.SNK (ST13) occur, the Port Power Role is switched from Try.SRC to SRC only.

That is, the process of determining whether or not the Port Power Role of the opposing device is Try.SRC includes a process of determining whether or not the state transition path until the Power Role of the own device is determined to be Sink is the order of Attached.SRC, TryWait.SNK, and Attached.SNK.

(c4: Sequence)

Next, an example of sequences of a device according to the first embodiment will be described.

Figure 7:
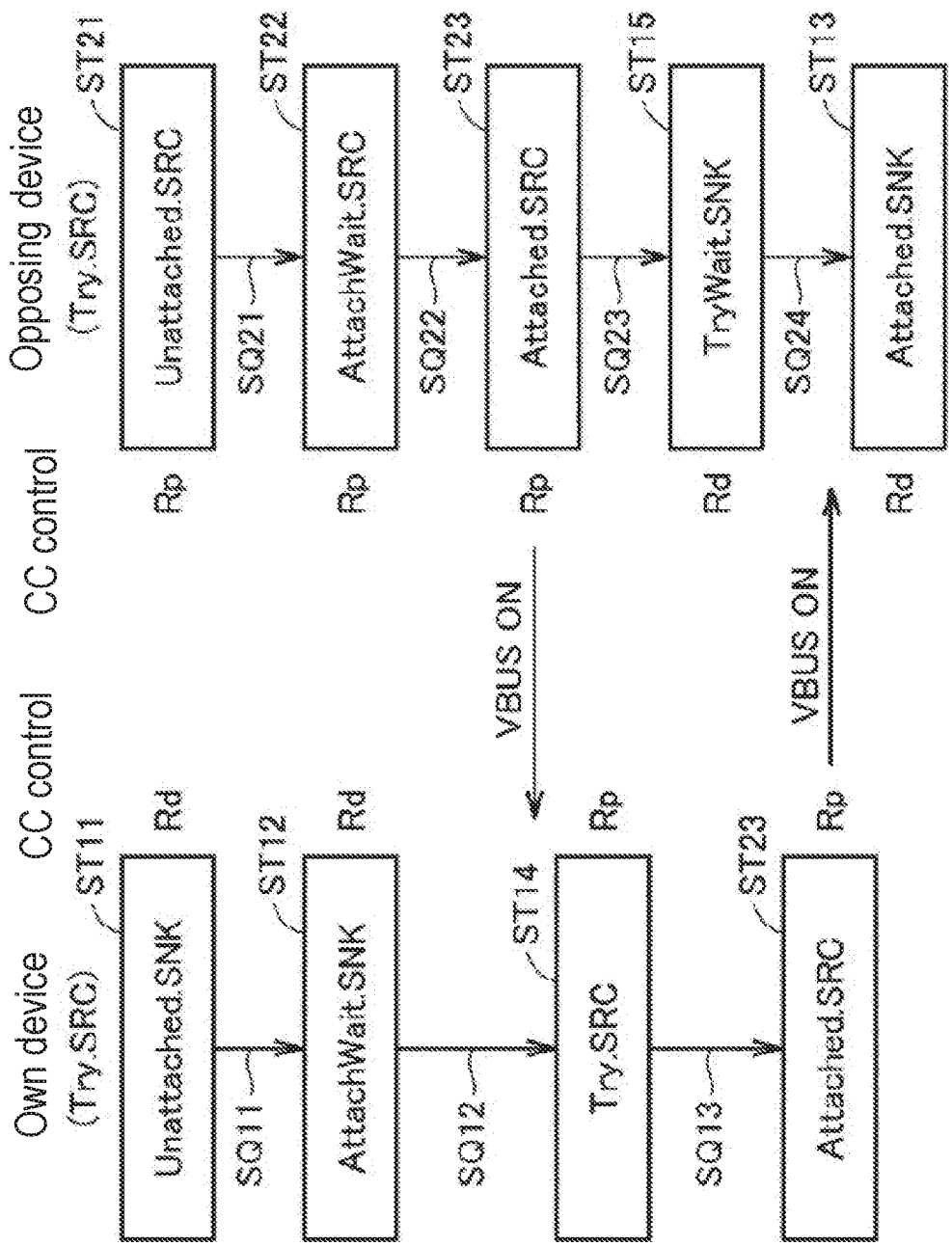
FIG. 7 is a diagram illustrating an example of sequences (no Port Power Role switching) when a device according to the first embodiment is connected to an opposing device whose Port Power Role is Try.SRC.
Figure 8:
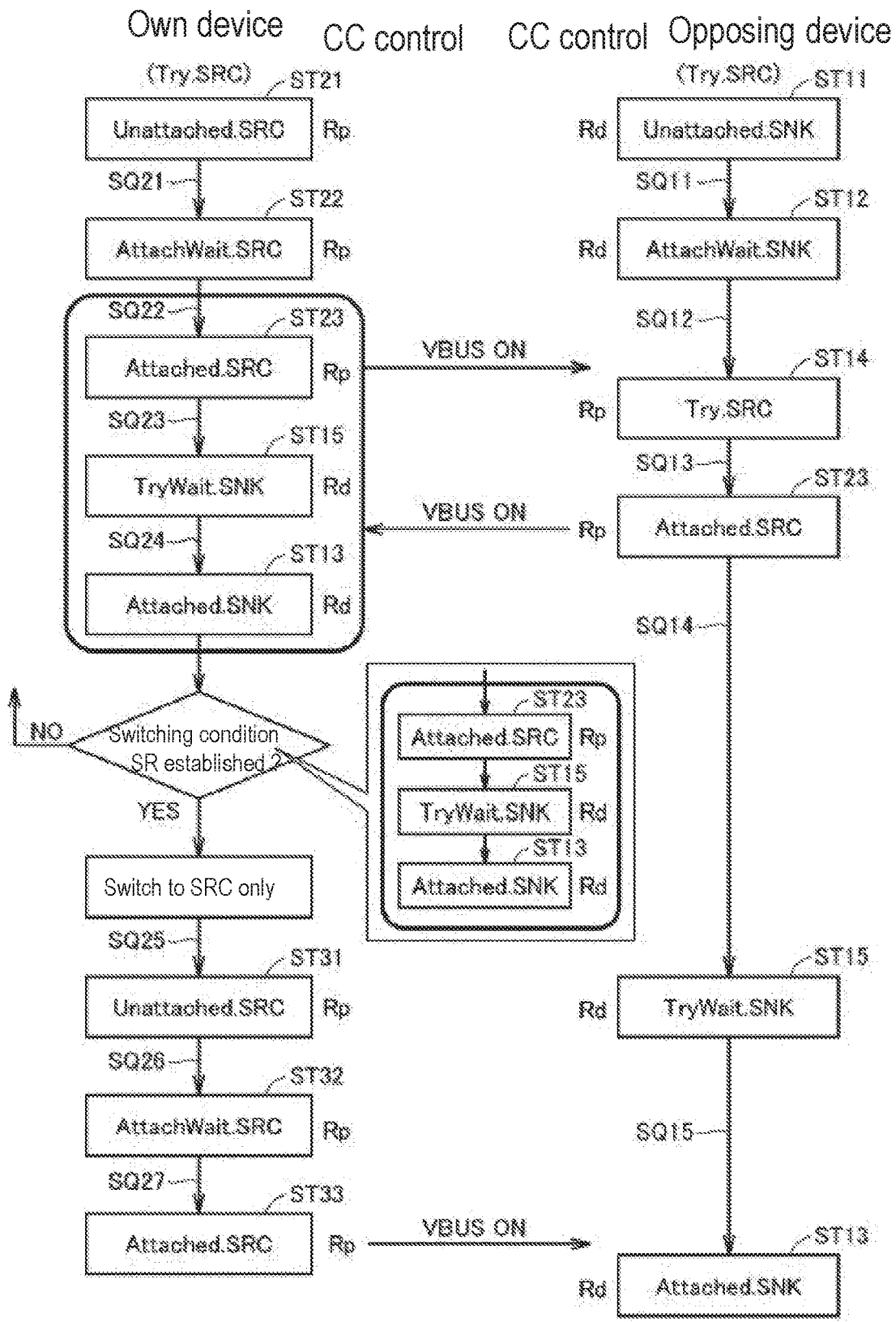
FIG. 8 is a diagram illustrating an example of sequences (with Port Power Role switching) when a device according to the first embodiment is connected to an opposing device whose Port Power Role is Try.SRC.

FIG. 7 is a diagram illustrating an example of sequences (without Port Power Role switching) when the device according to the first embodiment is connected to an opposing device whose Port Power Role is Try.SRC. FIG. 8 is a diagram illustrating an example of sequences (with Port Power Role switching) when the device according to the first embodiment is connected to an opposing device whose Port Power Role is Try.SRC.

Figure 9:
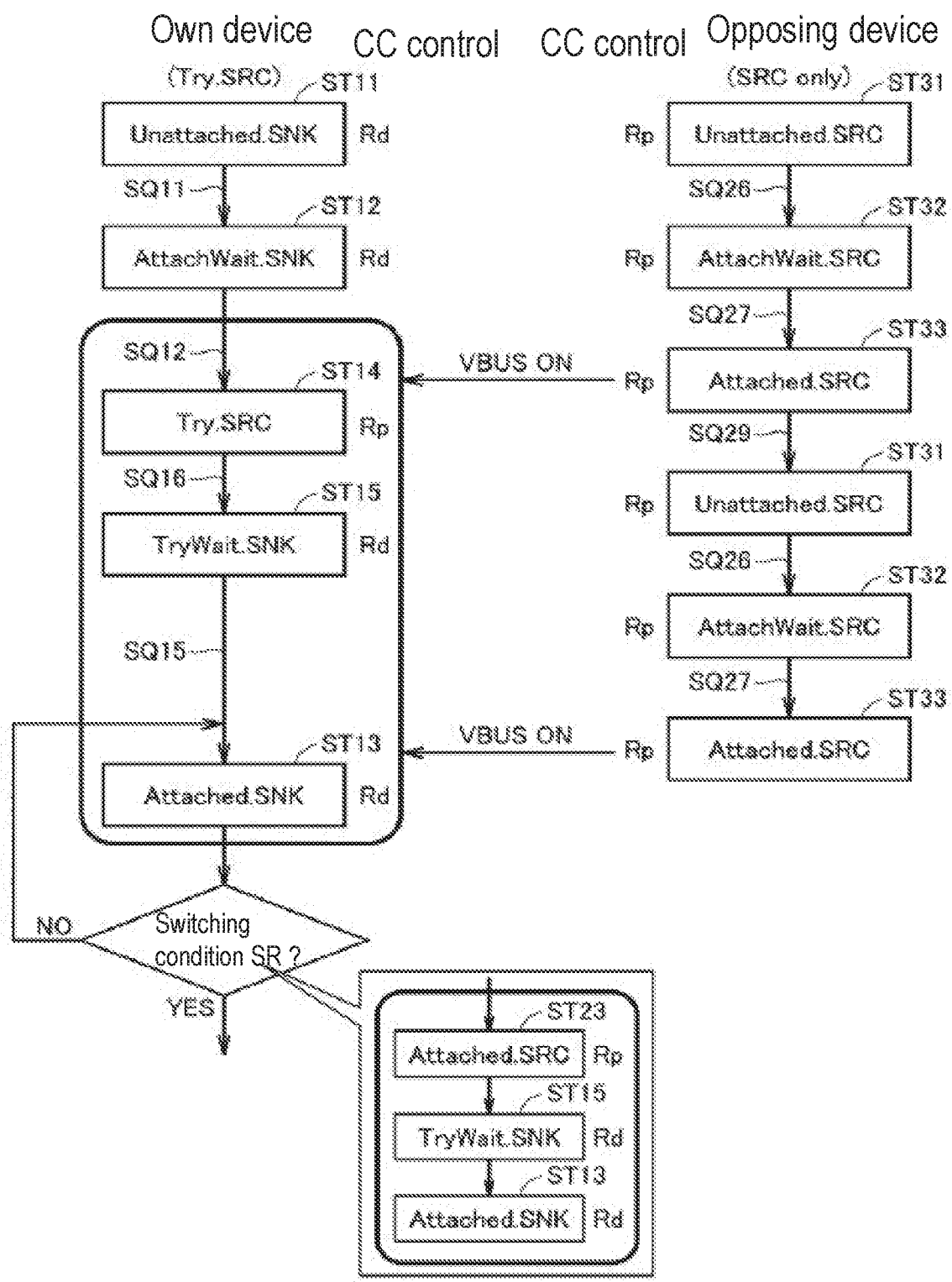
FIG. 9 is a diagram illustrating an example of sequences when a device according to the first embodiment is connected to an opposing device whose Port Power Role is SRC only.

FIG. 9 is a diagram illustrating an example sequence when the device according to the first embodiment is connected to an opposing device whose Port Power Role is SRC only.

Figure 10:
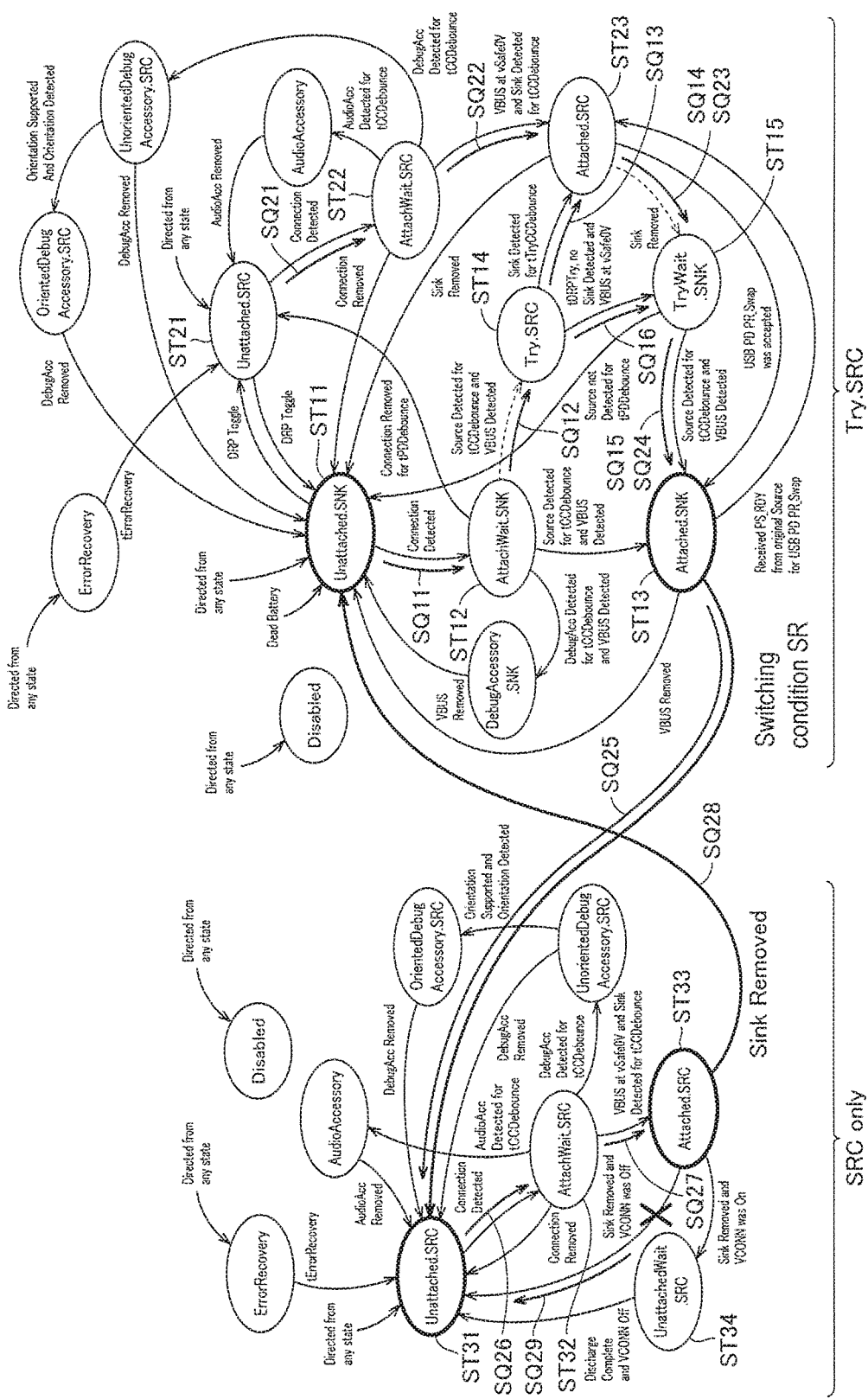
FIG. 10 shows a state machine corresponding to each sequence shown in FIG. 7 to FIG. 9.

FIG. 10 is a diagram showing a state machine corresponding to each sequence shown in FIGS. 7 to 9. In the sequences shown in FIGS. 7 to 9, the Port Power Role of own device is Try.SRC. The "CC control" shown in FIGS. 7 to 9 indicates the resistance values appearing in the first communication line 21 (CC1) and the second communication line 22 (CC2) (see FIGS. 3 and 4).

First, the example of the sequences shown in FIG. 7 shows an example in which the Power Role is set to SRC without dynamically switching the Port Power Role to SRC only. Referring to FIG. 7, it is assumed that the own device is in Unattached.SNK (ST11) and the opposing device is in Unattached.SRC (ST21) in the initial state. In the unconnected state, both the own device and the opposing device perform toggling operations for alternately transitioning between Unattached.SNK (ST11) and Unattached.SRC (ST21).

The own device transitions to AttachWait.SNK (ST12) according to the sequence (sequence SQ11). On the other hand, the opposing device transitions to AttachWait.SRC (ST22) according to the sequence (sequence SQ21), and the opposing device transitions to Attached.SRC (ST23) (sequence SQ22). With the transition to Attached.SRC (ST23), the opposing device applies a predetermined voltage to the electric power line (VBUS) 23 (VBUS ON).

By detecting VBUS ON by the opposing device, the own device transitions to Try.SRC (ST14) (sequence SQ12), and further transitions to Attached.SRC (ST23) (sequence SQ13). Then, the own device applies a predetermined voltage to the electric power line (VBUS) 23 (VBU SON).

On the other hand, since the opposing device cannot detect SNK with respect to VBUS ON, it transitions to the TryWait.SNK (ST15) (sequence SQ23), and opposing device transitions to Attached.SNK (ST13) by detecting VBUS ON, by the own device (sequence SQ24).

According to the above-described sequences, after the own device and the opposing device are connected, the Power Role of the own device becomes SRC, and the Power Role of the opposing device becomes SNK.

Next, an example of the sequences shown in FIG. 8 shows an example in which the Power Role is set to SRC by dynamically switching the Port Power Role to SRC only. Referring to FIG. 8, it is assumed that the own device is in Unattached.SRC (ST21) and the opposing device is in Unattached.SNK (ST11) in the initial state.

The own device transitions to AttachWait.SRC (ST22) according to the sequence (sequence SQ21). In addition, the own device transitions to Attached.SRC (ST23) (Sequence SQ22). With the transition to Attached.SRC (ST23), the own device applies a predetermined voltage to the electric power line (VBUS) 23 (VBUS ON). Since the own device cannot detect SNK for VBUS ON, it transitions to TryWait.SNK (ST15) (sequence SQ23), where the own device transitions to Attached.SNK (ST13) by detecting VBUS ON by the opposing device (sequence SQ24).

On the other hand, the opposing device transitions to AttachWait.SNK (ST12) according to the sequence (sequence SQ11). Here, by detecting VBUS ON by the own device, the opposing device transitions to Try.SRC (ST14) (sequence SQ12), and further transitions to Attached.SRC (ST23) (sequence SQ13). Then, the opposing device applies a predetermined voltage to the electric power line (VBUS) 23 (VBUS ON).

In Attached.SNK (ST13), the own device determines whether or not the switching condition SR is satisfied. As described above, the switching condition SR is whether or not state transition paths of Attached.SRC (ST23), TryWait.SNK (ST15), and Attached.SNK (ST13) have occurred. In the case shown in FIG. 8, it is determined that the switching condition SR is satisfied, and the own device switches the Port Power Role from Try.SRC to SRC only. Then, the own device transitions to Unattached.SRC (ST31) (Sequence SQ25). Here, since the opposing device cannot detect SNK with respect to VBUS ON, it transitions to TryWait.SNK (ST15) (sequencing SQ14).

The own device transitions to AttachWait.SRC (ST32) (sequence SQ26) and further transitions to Attached.SRC (ST33) (sequence SQ27) in accordance with the sequence.

With the transition to Attached.SRC (ST33), the own device applies a predetermined voltage to the electric power line (VBUS) 23 (VBUS ON). Then, the opposing device transitions from TryWait.SNK (ST15) to Attached.SNK (ST13) by detecting VBUS ON by the own device (Sequence SQ15).

According to the above-described sequences, after the own device and the opposing device are connected, the Power Role of the own device becomes SRC, and the Power Role of the opposing device becomes SNK.

Next, an example of sequences shown in FIG. 9 shows an example in which sequences according to the USB Type-C standard is executed even when a device according to the first embodiment is connected to a device whose Port Power Role is SRC only.

Referring to FIG. 9, it is assumed that the own device is in Unattached.SNK (ST11) and the opposing device is in Unattached.SRC (ST31) (the state machine of SRC only) in the initial state.

The own device transitions to AttachWait.SNK (ST12) according to the sequence (sequence SQ11). Then, by detecting the VBUS ON by the opposing device, the own device transitions to Try.SRC (ST14) (sequence SQ12), and the own device transitions to TryWait.SNK (ST15) (sequence SQ16). Here, by detecting VBUS ON by the opposing device, the own device transitions to Attached.SNK (ST13) (sequential SQ15).

In Attached.SNK (ST13), the own device determines whether or not the switching condition SR is satisfied. As described above, the switching condition SR is whether or not state transition paths of Attached.SRC (ST23), TryWait.SNK (ST15), and Attached.SNK (ST13) have occurred. In the case shown in FIG. 9, it is determined that the switching condition SR is not satisfied, and Attached.SNK (ST13) is maintained.

On the other hand, the opposing device transitions to AttachWait.SRC (ST32) (sequence SQ26) and further transitions to Attached.SRC (ST33) (sequence SQ27) in accordance with the sequence.

With the transition to Attached.SRC (ST33), the opposing device applies a predetermined voltage to the electric power line (VBUS) 23 (VBUS ON). At this point, the opposing device returns to Unattached.SRC (ST31) because it cannot detect SNK for the VBUS ON (sequencing SQ29).

Then, the opposing device transitions to AttachWait.SRC (ST32) (sequence SQ26) and further transitions to Attached.SRC (ST33) (sequence SQ27) in the same manner as the previously executed sequences. With the transition to Attached.SRC (ST33), the opposing device applies a predetermined voltage to the electric power line (VBUS) 23 (VBUS ON). At this point, since the Power Role of the own device is determined to be SNK, the opposing device detects SNK of the connection destination, and finally, after the connection between the own device and the opposing device, the Power Role of the own device becomes SNK, and the Power Role of the opposing device becomes SRC.

[c5: Brief Summary]

According to the device according to the first embodiment, the Power Role of the own device can be reliably determined to SRC, even if the Port Power Role of both the own device and the opposing device, which is the device of the connection destination, are Try.SRC, a type of DRP. As a result, it is possible to ensure that various processes executed in association with the Power Role are executed reliably.

D. Second Embodiment

In the first embodiment described in above, the process of connecting a device in accordance with the first embodiment and a device in accordance with the USB Type-C standard is described. In the second embodiment, an improvement in the case where devices according to the first embodiment are connected to each other will be described.

Figure 11:
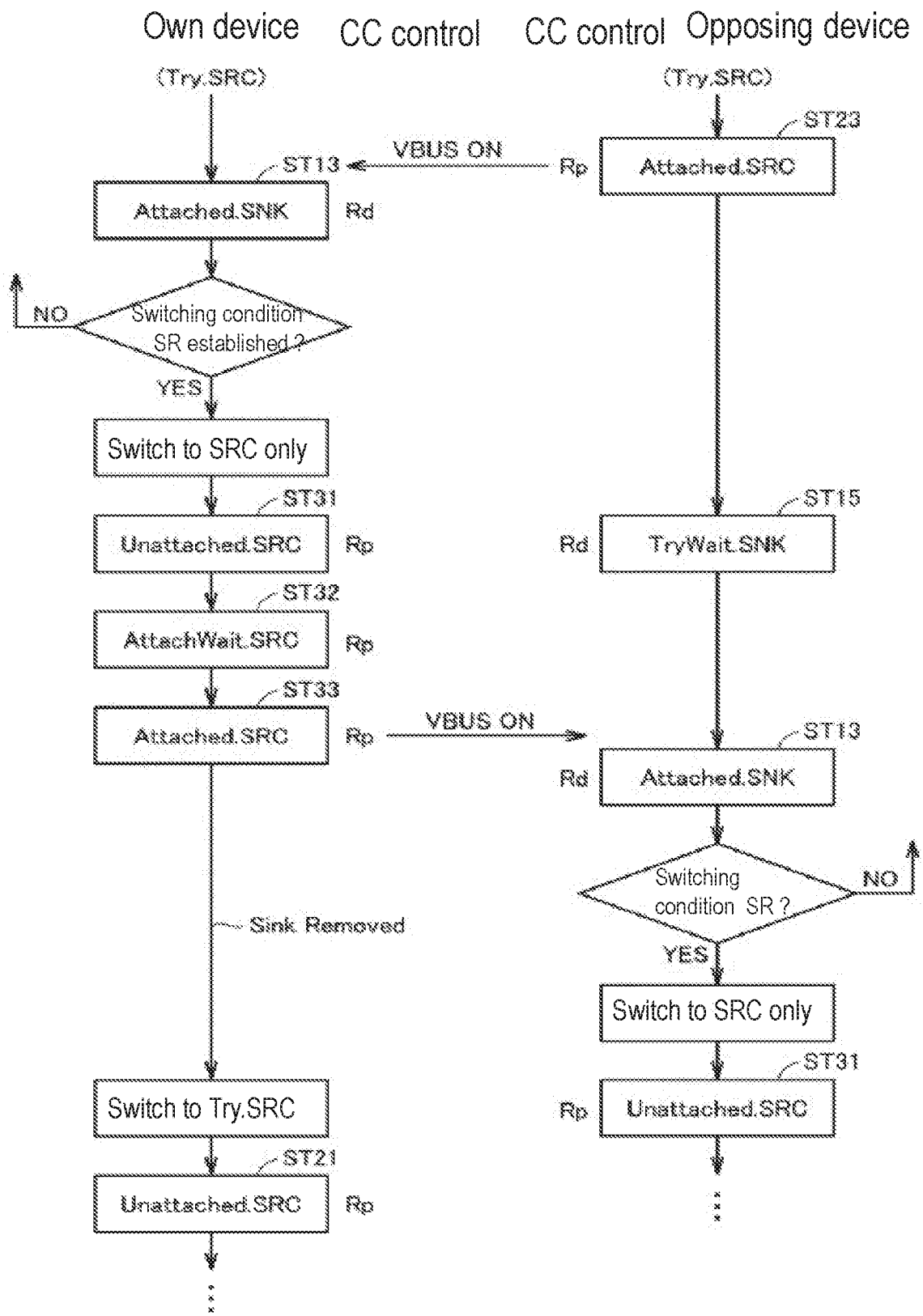
FIG. 11 is a diagram illustrating an example of sequences in which devices according to the first embodiment are connected together.

FIG. 11 is a diagram showing an example of sequences when devices according to the first embodiment are connected to each other. FIG. 11 shows a state after the devices according to the first embodiment are connected to each other and a predetermined sequence is executed.

Referring to FIG. 11, it is assumed, for example, that the opposing device is in Attached.SRC (ST23). On the other hand, it is assumed that the own device transitions to Attached.SNK (ST13) in accordance with the sequences. Then, the own device determines whether or not the switching condition SR is satisfied in Attached.SNK (ST13).

In the case shown in FIG. 11, it is determined that the switching condition SR is satisfied, and the own device switches the Port Power Role from Try.SRC to SRC only. Then, the own device transitions to Unattached.SRC (ST31). Then, the own device transitions to AttachWait.SRC (ST32) and further transitions to Attached.SRC (ST33) in accordance with the sequences.

With the transition to Attached.SRC (ST33), the own device applies a predetermined voltage to the electric power line (VBUS) 23 (VBUS ON).

On the other hand, since the opposing device cannot detect SNK with respect to the VBUS ON, it transitions to TryWait.SNK (ST15), and further transitions to Attached.

SNK (ST13). Then, the opposing device determines whether or not the switching condition SR is satisfied in Attached.SNK (ST13).

In the case shown in FIG. 11, it is determined that the switching condition SR is satisfied, and the opposing device switches the Port Power Role from Try.SRC to SRC only. Then, the opposing device transitions to Unattached.SRC (ST31). Then, since the own device cannot detect SNK for the VBUS ON, it detects that SNK is disconnected from the opposing device (Sink Removed), switches the Port Power Role from SRC only to Try.SRC, and transitions to Unattached.SRC (ST21).

As described above, when the devices according to the first embodiment are connected to each other, it is determined that the switching condition SR is satisfied in both the devices, so that the switching of the Port Power Role occurs in both the devices, and the devices do not settle in a particular state. That is, when devices according to the first embodiment are connected to each other, each device determines that the Port Power Role of the opposing device is Try.SRC, and switches the Port Power Role of the own device to SRC only. Then, all of the devices become SRCs, and there is a possibility that the respective devices Sink Removed detect that the connection with the opposing device has been disconnected, and return the Port Power Role to Try.SRC to execute the reconnection sequences.

Figure 12:
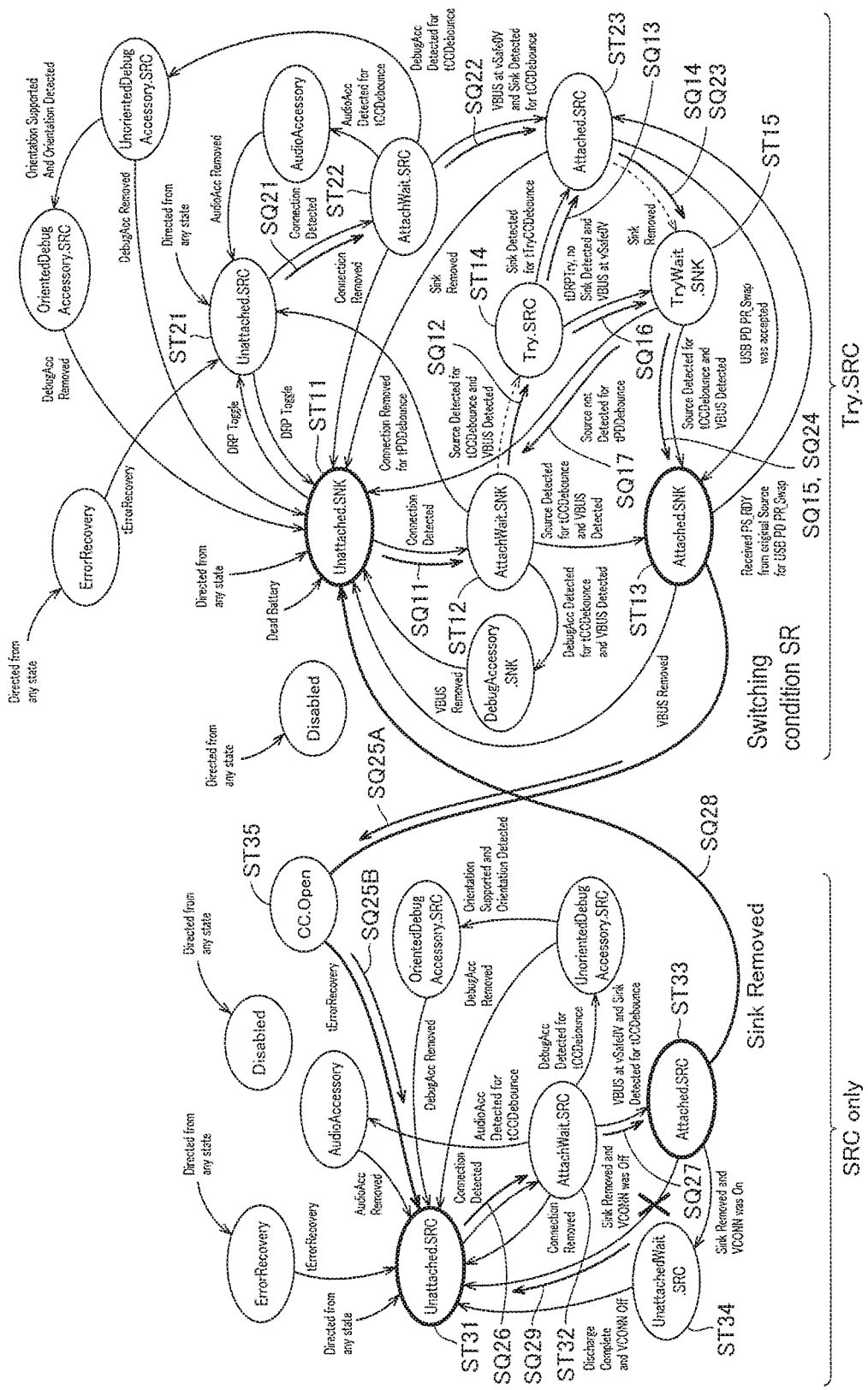
FIG. 12 is a diagram illustrating an example of a state machine of a device according to the second embodiment.

In the second embodiment, a device in which the above-described problem does not occur will be described. FIG. 12 is a diagram showing an example of a state machine of a device according to the second embodiment. Referring to FIG. 12, the state machine of the device according to the second embodiment is newly added with CC.Open (ST35) as compared with the state machine of the device according to the first embodiment shown in FIG. 10.

CC.Open (ST35) means a state in which the first communication line (CC1) 21 and the second communication line (CC2) 22 are opened. That is, when the device transitions to CC.Open (ST35), the device electrically disconnects both the resistance value Rp and the resistance value Rd that may be connected to the first communication line (CC1) 21 and the second communication line (CC2) 22. As a result, the opposing device seems to have disconnected from the target devices.

In this manner, when the Port Power Role of the own device is switched SRC only, the opposing device determines that the Port Power Role of the own device is SRC only by passing through CC.Open (ST35). That is, the process of switching the Port Power Role from Try.SRC to SRC only includes a process of opening the communication lines (the first communication line (CC1) 21 and the second communication line (CC2) 22) electrically connected to the opposing device.

This makes it possible to avoid the mutual devices respectively judging that the Port Power Role of the opposing device is Try.SRC. That is, it is possible to prevent the devices according to the first embodiment from repeatedly switching the Port Power Role.

Figure 13:
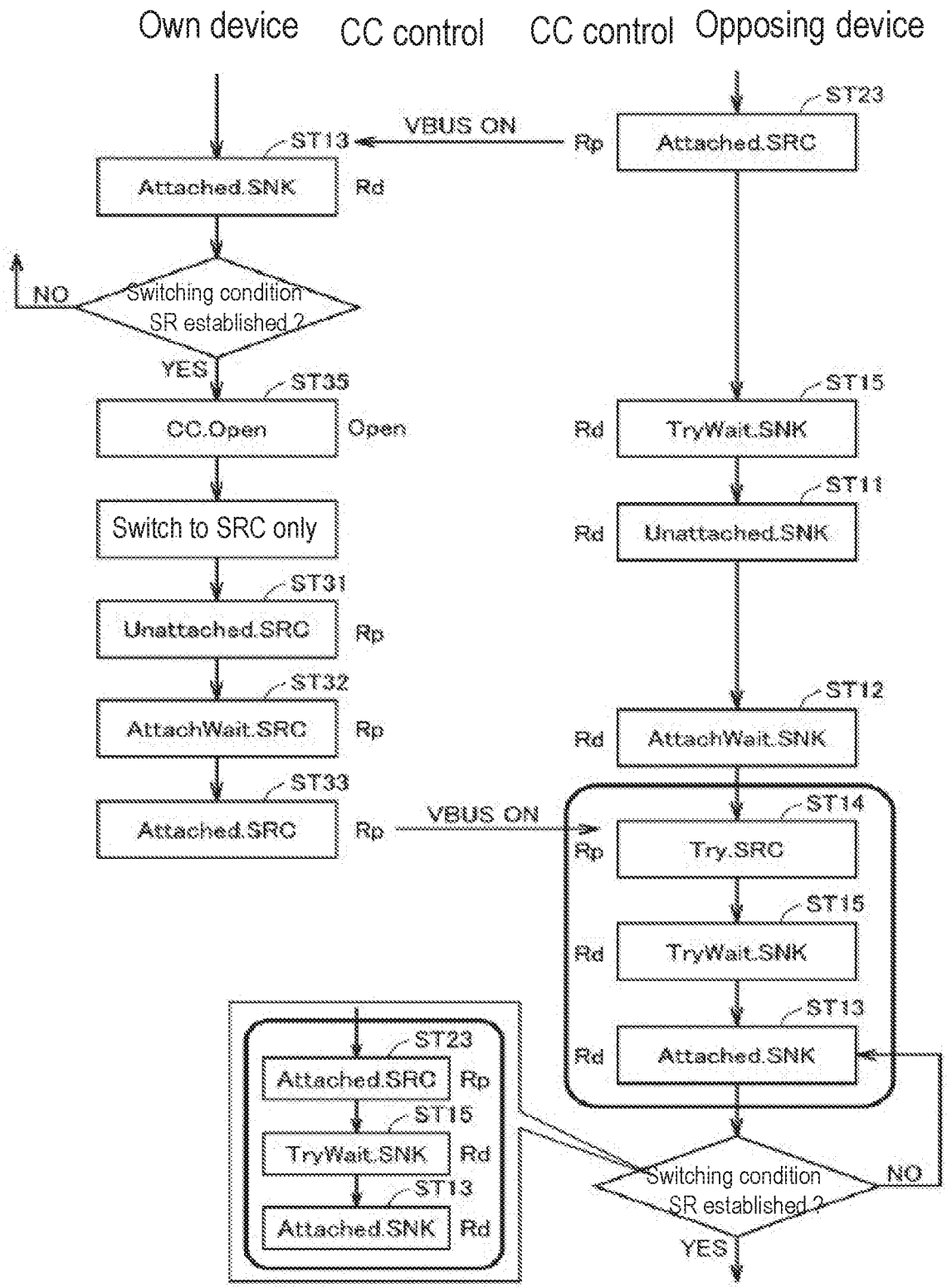
FIG. 13 is a diagram showing an example of sequences in a case where a device according to the second embodiment and a device according to the first embodiment are connected to each other.

FIG. 13 is a diagram showing an example of sequences when a device according to the second embodiment and a device according to the first embodiment are connected.

Referring to FIG. 12 and FIG. 13, for example, it is assumed that the opposing device, which is a device according to the first embodiment, is in Attached.SRC (ST23). On the other hand, it is assumed that the own device, which is the device according to the second embodiment, transitions to Attached.SNK (ST13) in accordance with the sequences. Then, the own device determines whether or not the switching condition SR is satisfied in Attached.SNK (ST13).

In the case shown in FIG. 13, it is determined that the switching condition SR is satisfied, and the own device switches the Port Power Role from Try.SRC to SRC only. Then, the own device transitions to the CC.Open state (ST35) (Sequence SQ25A). Thereafter, after the error recovery time tErrorRecovery has elapsed, the own device transitions to Unattached.SRC (ST31) (sequence SQ25B).

Then, the own device transitions to AttachWait.SRC (ST32) and further transitions to Attached.SRC (ST33) in accordance with the sequences.

With the transition to Attached.SRC (ST33), the own device applies a predetermined voltage to the electric power line (VBUS) 23 (VBUS ON).

On the other hand, since the opposing device cannot detect SNK with respect to VBUS ON, it transitions to TryWait.SNK (ST15) (sequencing SQ23). In TryWait.SNK (ST15), since the opposing device cannot detect SRC (Source not Detected), it transitions to Unattached.SNK (ST11) (sequence SQ17).

Then, the opposing device transitions from Unattached.SNK (ST11) to AttachWait.SNK (ST12) in accordance with the sequence (sequence SQ11). Subsequently, by detecting the VBUS ON by the own device, the opposing device transitions to Try.SRC (ST14) (sequence SQ12), and further transitions sequentially to TryWait.SNK (ST15) and Attached.SNK (ST13) (sequence SQ16 and SQ15).

In Attached.SNK (ST13), the opposing device determines whether or not the switching condition SR is satisfied. As described above, the switching condition SR is whether or not state transition paths of Attached.SRC (ST23), TryWait.SNK (ST15), and Attached.SNK (ST13) have occurred. In the case shown in FIG. 13, it is determined that the switching condition SR is not satisfied, and Attached.SNK (ST13) is maintained.

Finally, after connecting the own device and the opposing device, the Power Role of the own device becomes SRC, and the Power Role of the opposing device becomes SNK.

Except for the treatment and the configuration described above, all the points are the same as those in the first embodiment described above, and therefore, detailed description thereof will not be repeated.

According to the second embodiment, even when devices according to the first embodiment are connected to each other, a situation in which the Power Role cannot be determined and the process is repeated can be avoided.

E. Third Embodiment

In the first and second embodiments described above, the condition of whether or not the state transition path leading to Attached.SNK (ST13) matches the predetermined state transition path was used as the switching condition SR.

Incidentally, in the test (Type-C Compliance Test) as to whether or not it conforms to the USB Type-C standard specified in the above-mentioned "Universal Serial Bus Type-C (USB Type-C) Functional Test Specification", Revision: 0.79, May 28, 2018 or the like, it is determined whether or not the device to be tested (the port of the own device) correctly transitions to the state defined in the USB Type-C standard.

When it is determined that the switching condition SR is satisfied in Attached.SNK (ST13), the devices according to the first and second embodiments dynamically switch the Port Power Role to SRC only, and therefore, the devices transit to another state instead of Attached.SNK (ST13). As a result, there is a possibility that "Test Fail" is determined.

In order for the devices according to the first and second embodiments to obtain the determination result of "TestPass" in the Type-C Compliance Test, a condition of "waiting for a predetermined period" may be added to the switching condition SR.

Figure 14:
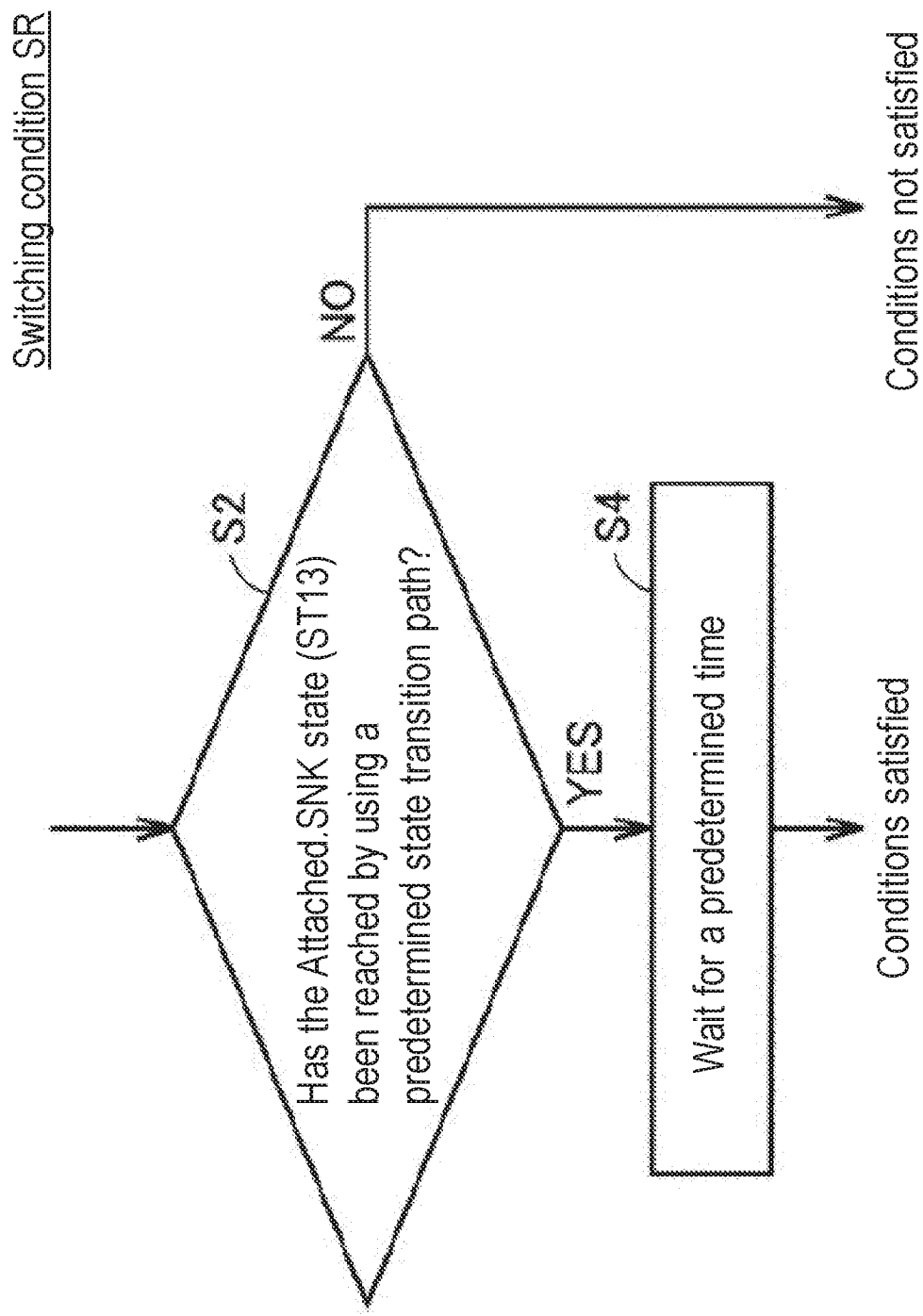
FIG. 14 is a diagram for explaining a switching condition SR employed in a device according to the third embodiment.

FIG. 14 is a diagram for explaining a switching condition SR employed in the device according to the third embodiment. Referring to FIG. 14, as the switching condition SR, first, it is determined whether or not Attached.SNK (ST13) has been reached in a predetermined state transition path (step S2). Here, the predetermined state transition path is state transitions in the order of Attached.SRC (ST23), Try-Wait.SNK (ST15), and Attached.SNK (ST13).

If Attached.SNK (ST13) is not reached in the predetermined state transition path (NO in step S2), the switching condition SR is determined as not being satisfied.

On the other hand, if Attached.SNK (ST13) is reached in the predetermined state transition path (YES in step S2), the switching condition SR is determined to be satisfied after waiting for a predetermined period of time (step S4).

As described above, the process of determining whether or not the Port Power Role of the opposing device is Try.SRC includes a process of waiting for a predetermined time after the Port Power Role of the opposing device is determined to be Try.SRC.

According to the device according to the third embodiment, by employing the switching condition SR as shown in FIG. 14, it is possible to obtain the determination result of "Test Pass" in the Type-C Compliance Test even in the device in which the functions as shown in the first and second embodiments are implemented.

Note that the switching condition SR according to the third embodiment can be applied regardless of whether or not the target device supports the USB Power Delivery (hereinafter, also simply referred to as "PD") specified in "Universal Serial Bus Power Delivery Specification", Revision: 3.0, Version: 1.2, Jun. 21, 2018 or the like.

Except for the treatment and the configuration described above, all the points are the same as those in the first embodiment described above, and therefore, detailed description thereof will not be repeated.

F. Fourth Embodiment

In the USB Power Delivery (PD) described in "Universal Serial Bus Power Delivery Specification", Revision: 3.0, Version: 1.2, Jun. 21, 2018, etc., a Power Role Swap instruction is provided for switching the Power Role between devices. When both of the connected devices support PD, a Power Role determination process or a switching process using a Power Role Swap command is performed as a normal operation.

That is, among devices supporting PD, it is preferable that Power Role determination processing using a Power Role Swap instruction executed at the level of PD is prioritized, rather than Power Role determination processing executed at the level of the USB Type-C standard according to the first and second embodiments described above.

In order not to hinder the exchange of Power Role Swap instructions between devices supporting such PD, a condition that "an opposing device does not support PD" may be added to the switching condition SR determined in Attached.SNK (ST13).

Figure 15:
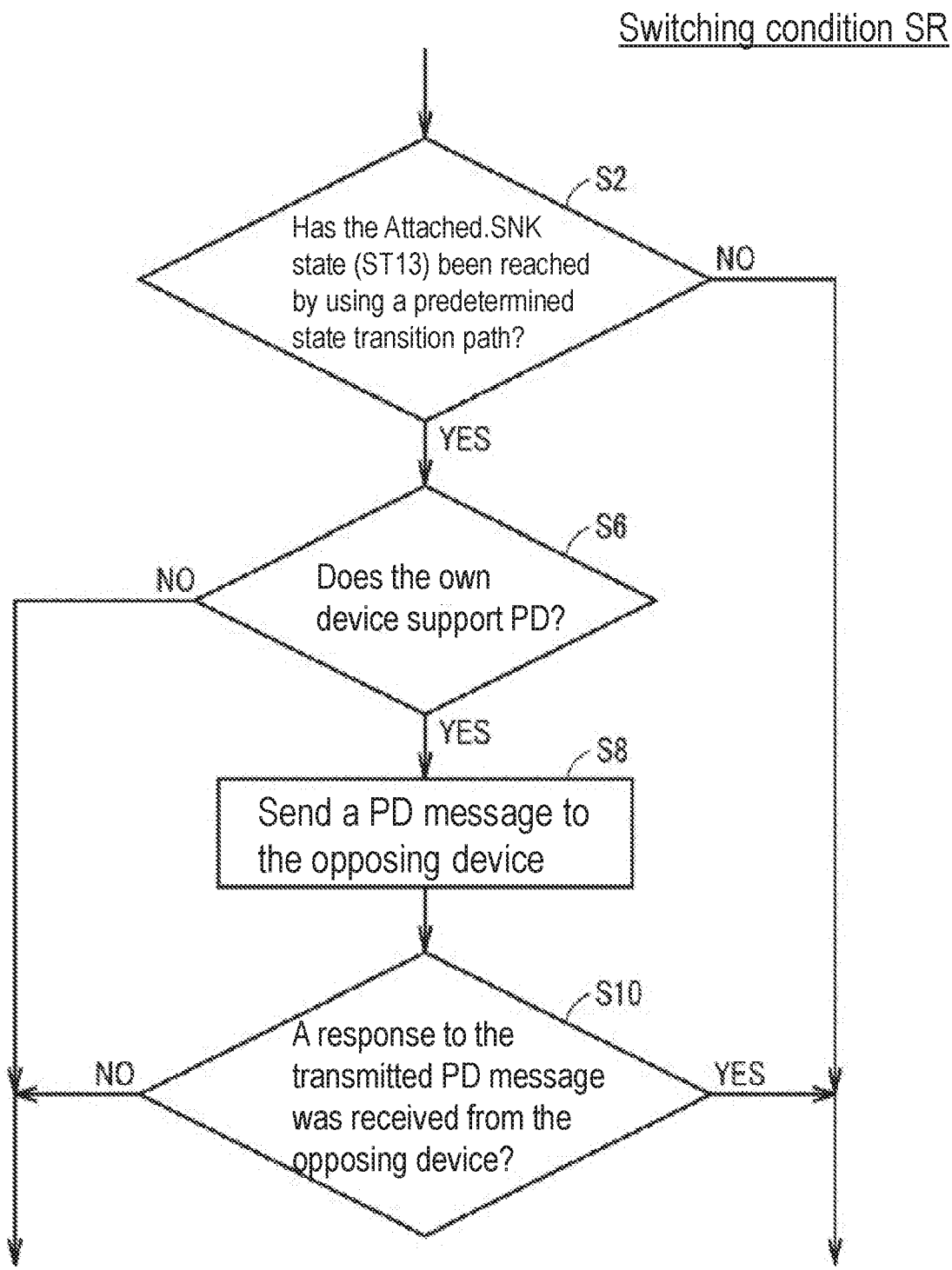
FIG. 15 is a diagram for explaining a switching condition SR employed in a device according to the fourth embodiment.

FIG. 15 is a diagram for explaining a switching condition SR employed in the device according to the fourth embodiment. Referring to FIG. 15, as the switching condition SR, first, it is determined whether or not Attached.SNK (ST13) has been reached in a predetermined state transition path (step S2). Here, the predetermined state transition path is state transitions in the order of Attached.SRC (ST23), Try-Wait.SNK (ST15), and Attached.SNK (ST13).

If Attached.SNK (ST13) is not reached in the predetermined state transition path (NO in step S2), the switching condition SR is determined as not being satisfied.

On the other hand, if Attached.SNK (ST13) is reached in the predetermined state transition path (YES in step S2), it is determined whether or not the own device supports the PD (step S6). If the own device does not support PD (NO in S6), the switching condition SR is determined to be satisfied. That is, since the own device cannot exchange the Power Role Swap command, it can be determined that no problems occur even if the Port Power Role is dynamically switched as shown in the first and second embodiments.

If the own device supports PD (YES in step S6), the own device sends a PD message to the opposing device (step S8). The transmitted PD message may be an inquiry message of a Policy Engine state defined in the PD standard. In operation S10, the own device determines whether a reply to the transmitted PD message has been received from the opposing device.

If a response to the PD message is not received (NO in step S10), the switching condition SR is determined to be satisfied. That is, since it can be determined that the opposing device does not support PD, it can be determined that no problems occur even if the Port Power Role is dynamically switched as shown in the first and second embodiments.

On the other hand, if a response to the PD message is received (YES in step S10), it is determined that the switching condition SR is not satisfied. That is, since it can be determined that the opposing device also supports PD, the Port Power Role dynamically switching as shown in the first and second embodiments is not performed.

Thus, the process of determining whether the Port Power Role of the opposing device is Try.SRC includes the process of determining whether the opposing device supports the USB Power Delivery. Then, the controller 110 of the device according to the fourth embodiment executes a process of switching the Port Power Role of the own device to SRC only when the opposing device does not support the USB Power Delivery.

According to the device according to the fourth embodiment, by adopting the switching condition SR as shown in FIG. 15, it is possible to obtain a determination result of "Test Pass" in the Type-C Compliance Test even when the device having the functions as shown in the first and second embodiments supports PD.

Except for the treatment and the configuration described above, all the points are the same as those in the first embodiment described above, and therefore, detailed description thereof will not be repeated.

G. Modification of Fourth Embodiment

In the fourth embodiment described above, the dynamic switching of the Port Power Role using the Power Role Swap instruction defined in the PD has been described. However, depending on the Power Role Swap policy of the opposing device, it may not be possible to use Power Role Swap instructions.

That is, if the opposing device responds with an Accept to the Power Role Swap Request instructing the dynamic switching of the Power Role, the Power Role can be switched, so that the operation is not problematic. On the other hand, when the opposing device responds to the Power Role Swap Request with the Reject, the own device cannot switch the Power Role by the Power Role Swap command.

In the PD, the device that has received the Power Role Swap Request (PR_Swap Message) responds with an Accept or Reject in accordance with the policy of the PD. For example, when a PR_Swap Message is received if the present Power Role is not the desired Role, the device responds with an Accept. On the other hand, when the PR_Swap Message is received when the present Power Role is the desired Role, the device responds with a Reject.

In order to uniquely determine the scheduled Power Role without depending on the Power Role Swap policy of the opposing device, it may be determined whether the switching condition SR is satisfied or not, based on responses from the opposing device. More specifically, when the Reject is returned from the opposing device to the Power Role Swap Request, it is determined that the switching condition SR is satisfied, and the Port Power Role may be switched SRC only at the USB Type-C standard levels according to the first and second embodiments.

Figure 16:
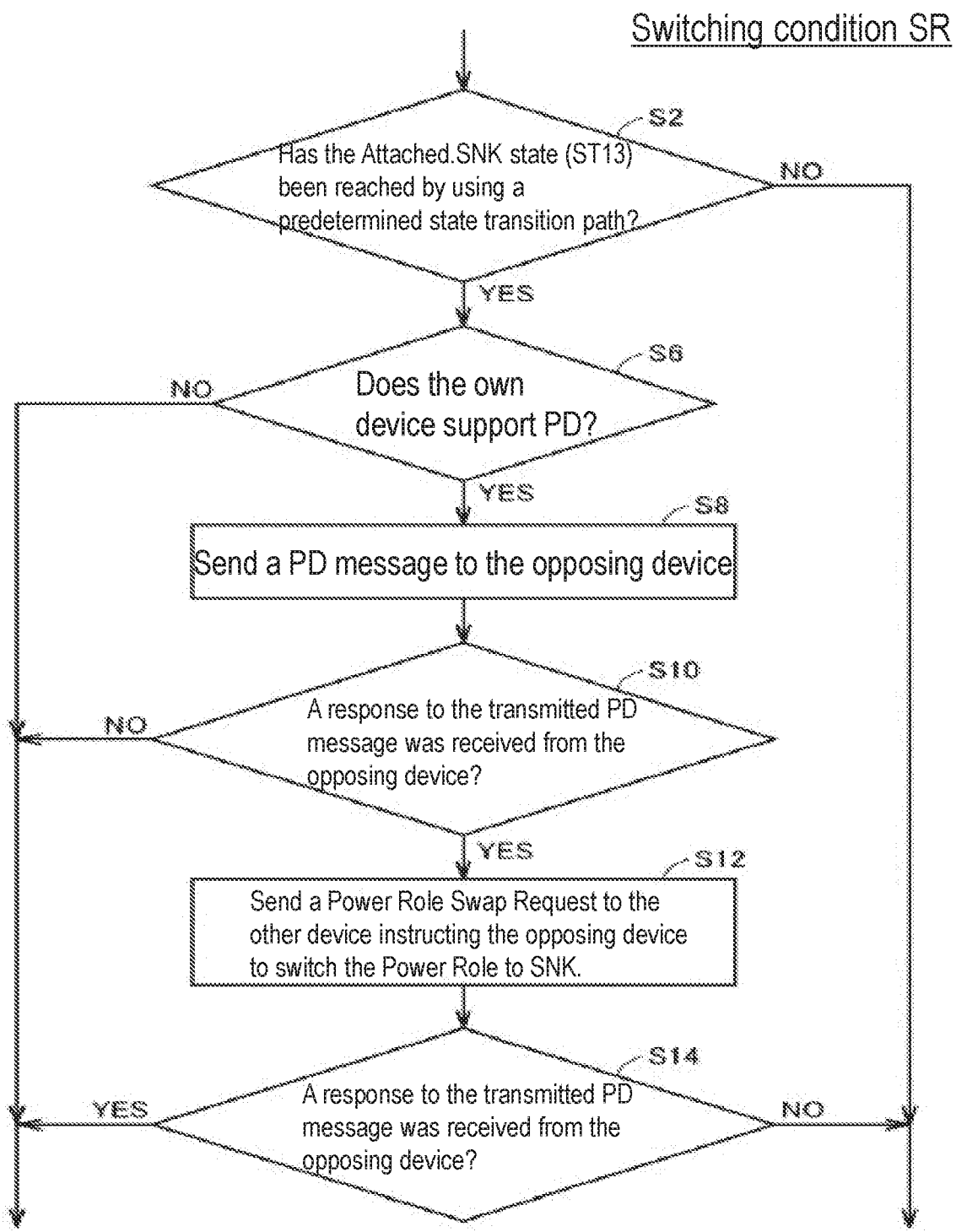
FIG. 16 is a diagram for explaining a switching condition SR employed in a device according to a modification of the fourth embodiment.

FIG. 16 is a diagram for explaining a switching condition SR employed in a device according to a modification of the fourth embodiment. The switching condition SR shown in FIG. 16 is obtained by further adding processing to the switching condition SR shown in FIG. 15. Therefore, the detailed description of the same steps as those of the switching condition SR shown in FIG. 15 will not be repeated.

Referring to FIG. 16, if a response to the PD message is received (YES in step S10), the own device transmits a Power Role Swap Request instructing the opposing device to switch the Power Role to SNK (step S12).

In operation S14, the own device determines whether the opposing device has responded to the transmitted Power Role Swap Request with a Reject. If the opposing device responds to an Accept (NO in step S14), then the switching condition SR is determined not to be satisfied.

On the other hand, if the opposing device responds with a Reject (YES in S14), the switching condition SR is determined to be satisfied. That is, the Port Power Role switching process is executed at the USB Type-C standard level instead of the Power Role Swap command level.

As described above, the process of determining whether or not the Port Power Role of the opposing device is Try.SRC includes a process of transmitting a Power Role Swap Request to the opposing device and a process of determining whether or not to receive a Reject from the opposing device. Then, the controller 110 of the device according to the modification of the fourth embodiment performs the process of switching the Port Power Role of the own device to SRC only, when the Reject is received from the opposing device.

As described above, if both connected devices support PD, the Power Role can be switched using the Power Role Swap command. However, depending on the policy of the opposing device, the opposing device may respond to the Power Role Swap Request with a Reject, in which case it will not be possible to set the desired Power Role. In the modification of the fourth embodiment, even in such cases, it is possible to forcibly set a desired Power Role by switching the Port Power Role at the USB Type-C standard level.

Except for the processing and the configuration described above, all the points are the same as in the first and fourth embodiments described above, and therefore, detailed description thereof will not be repeated.

H. Fifth Embodiment

Next, as the fifth embodiment, there will be exemplified sequences in which the Power Role of a device whose Port Power Role is Try.SNK can be uniquely determined as SNK.

More specifically, the device according to the fifth embodiment dynamically switches the Port Power Role to SNK only when Try.SNK is set as the initial-state Port Power Role and after connection, the Power Role must be fixed to SNK (when a predetermined switching condition SN is satisfied). By dynamically switching the Port Power Role, even when devices whose Port Power Role are Try.SNK are connected to each other, a predetermined device can be fixed to SNK.

[h1: An Example of Determining a Power Role]

FIG. 17 is a diagram showing an example of determining a Power Role in the device according to the fifth embodiment. Referring to FIG. 17, it is assumed that the Port Power Role of the own device is Try.SNK. If the Port Power Role of the opposing device is Try.SNK, the Port Power Role of the own device is switched from Try.SNK to SNK only. Thus, the Power Role of the own device is uniquely determined by SNK.

As the switching condition SN for switching the Port Power Role from Try.SNK to SNK only as described above, the fifth embodiment uses the state transition path when the own device is connected to the opposing device. More specifically, when the own device connects with the opposing device and the Power Role of the own device is SRC, if it is determined that the Port Power Role of the opposing device is Try.SNK, the Port Power Role of the own device is switched to SNK only and reconnected. When it is detected that the connection with the opposing device is disconnected, the Port Power Role of the opposing device is returned to Try.SNK again.

As described above, the device according to the fifth embodiment executes the process of determining whether or not the Port Power Role of the opposing device is Try.SNK when the Power Role of the own device is determined as SRC indicating the power supply side in accordance with the sequence with the opposing device, which is the device of the connection destination. Then, if the Port Power Role of the opposing device is Try.SNK, the device according to the fifth embodiment performs a process of switching the Port Power Role of the own device to SNK only and continuing the sequencing with the opposing device.

By dynamically switching such a Port Power Role, even if the Port Power Role of the opposing device is Try.SNK, after connection, the Power Role of the own device can be fixed to SNK.

[h2: State Machine]

Figure 18:
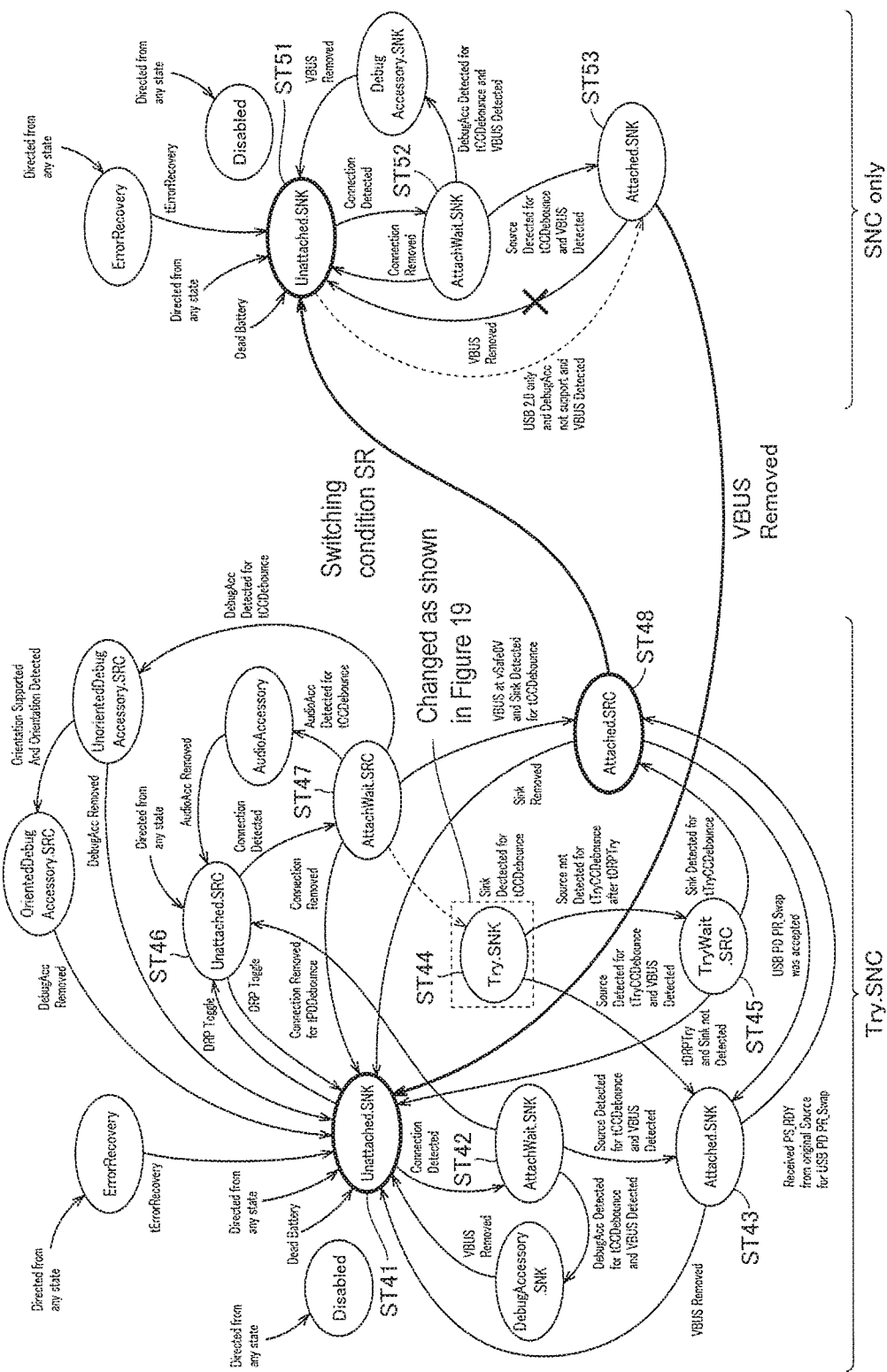
FIG. 18 is a diagram showing an example of a state machine of a device according to the fifth embodiment.

FIG. 18 illustrates an example of a state machine of a device according to the fifth embodiment. Referring to FIG. 18, devices according to the fifth embodiment will have both Try.SNK and SNK only state machines.

In the initial state, since the Port Power Role is Try.SRC, the operation is started in the state machine of Try.SRC. When the switching condition SN is satisfied by the transition of the state machine, the operation in the state machine of Try.SRC transitions to the operation in the state machine of SNK only.

In the operation of SNK only, when it is detected that the connection with the opposing device is disconnected (VBUS Removed), the state machine returns to the state machine of the Try.SNK instead of transitioning to Unattached.SNK (ST51). That is, the state returns the Port Power Role to Try.SNK and the device returns to the initial condition.

[h3: Switching Condition SN]

Next, the switching condition SN for switching the Port Power Role from Try.SNK to SNK only will be described. As the switching condition SN, a state transition path leading to Attached.SRC (ST48) is used.

Attached.SRC (ST48) corresponds to a state in which the Power Role of the device becomes SRC, but here, if the opposing device is SNK only, the operation follows the definition of FIG. 17, but if the opposing device is not SNK only, but Try.SNK, the operation does not follow the definition of FIG. 17, and the Power Role of the device needs to be switched to SNK.

That is, when the own device transitions to Attached.SRC (ST48), the Port Power Role of the opposing device is SNK only or Try.SNK. Therefore, after the own device transitions to Attached.SRC (ST48), it is determined whether the Port Power Role of the opposing device is SNK only or Try.SNK.

In the state machine shown in FIG. 17, the state transition path of the own device to Attached.SRC (ST48) is the same regardless of whether the Port Power Role of the opposing device is SNK only or Try.SNK. More specifically, the state transition paths to Attached.SRC (ST48) are AttachWait.SRC (ST47), Try.SNK (ST44), TryWaitSRC (ST45), and Attached.SRC (ST48).

Therefore, in the state machine of Try.SNK conforming to the USB Type-C standard, it is not possible to determine whether the opposing device is SNK only, or Try.SNK. Therefore, the device according to the fifth embodiment employs a state machine of Try.SNK in which the state machine of Try.SNK according to the USB Type-C standard is slightly changed.

Figure 19:
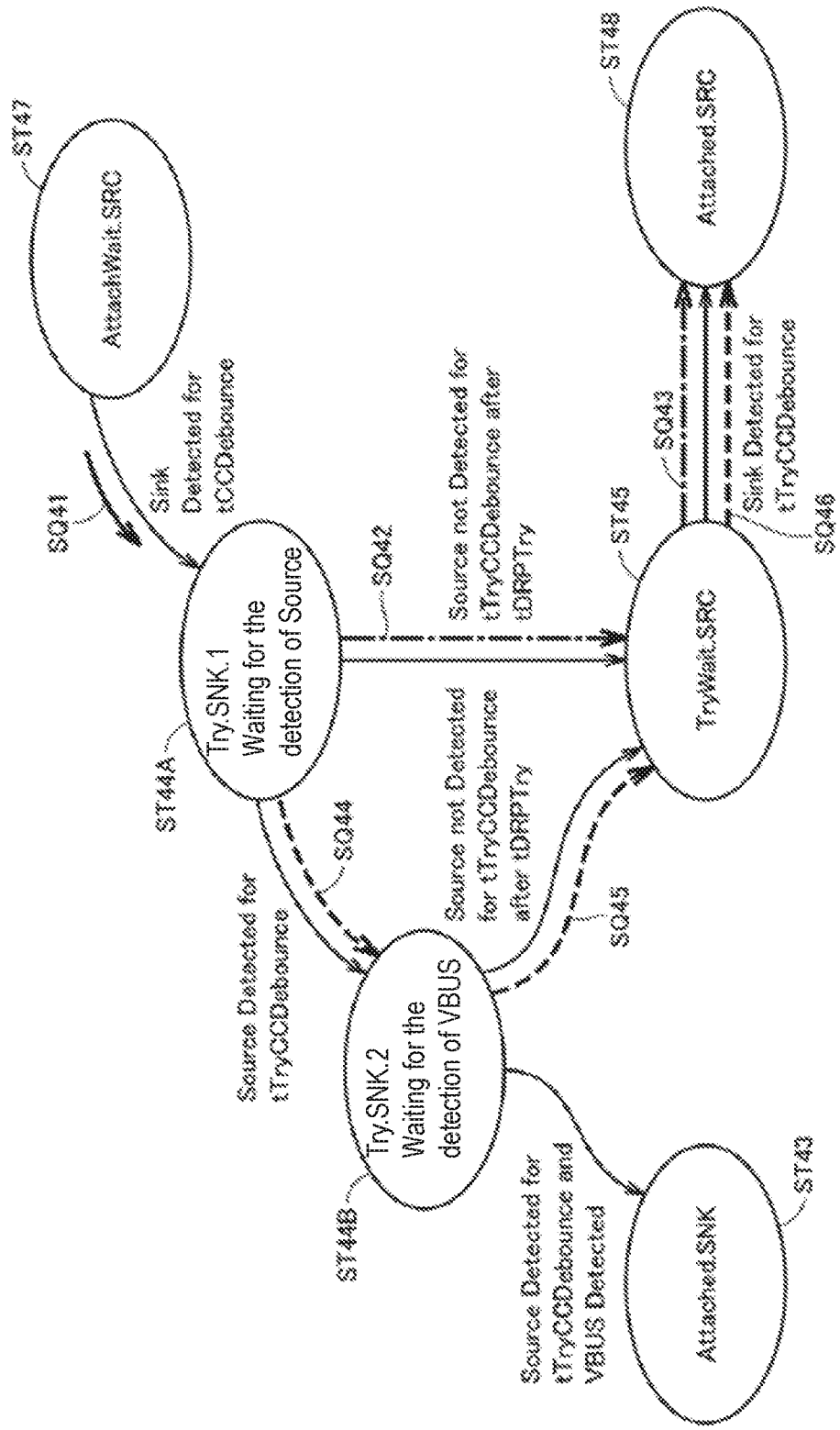
FIG. 19 is a diagram showing a main part of a state machine of a device according to the fifth embodiment.

FIG. 19 is a diagram showing a main part of the state machine of the device according to the fifth embodiment. Referring to FIG. 19, Try.SNK state machine employed in the fifth embodiment has two states (Try.SNK.1 (ST44A) and Try.SNK.2 (ST44B)) instead of Try.SNK (ST44) in Try.SNK state machine according to the USB Type-C standard.

Try.SNK.1 (ST44A) is a state waiting for the Power Role of the opposing device to become SRC (waiting to detect the Source). On the other hand, the Try.SNK.2 (ST44B) is a state waiting for VBUS ON by the opposing device (waiting for VBUS to be detected).

As described above, by decomposing Try.SNK (ST44) in the state machine of Try.SNK according to the USB Type-C standard into two states, the state transition path will be different depending on whether the Port Power Role of the opposite device is SNK only or Try.SNK. As the switching condition SN, the Port Power Role of the opposing device is determined on the basis of the difference between the state transition paths.

Referring to FIG. 19, more specifically, when the Port Power Role of the opposing device is SNK only, a transition (sequence SQ41) from AttachWait.SRC (ST47) to Try.SNK.1 (ST44A) is made, followed by a direct transition (sequence SQ42) to TryWait.SRC (ST45), and finally, Attached.SRC (ST48) is reached (sequence SQ43).

On the other hand, when the Port Power Role of the opposing device is Try.SNK, a transition from AttachWait.SRC (ST47) to Try.SNK.1 (ST44A) (sequence SQ41) is made, and then Source can be detected, so that the transition is made to Try.SNK.2 (ST44B) (sequence SQ44). Then, it makes a direct transition to TryWait.SRC (ST45) (sequence SQ45), and finally reaches Attached.SRC (ST48) (sequence SQ46).

As described above, when the Port Power Role of the opposing device is SNK only, state transition paths of AttachWait.SRC (ST47), Try. SNK.1 (ST44A), TryWait.SRC (ST45), and Attached.SRC (ST48) are taken. On the other hand, when the Port Power Role of the opposing device is Try.SNK, state transition paths of AttachWait.SRC (ST47), Try.SNK.1 (ST44A), Try.SNK.2 (ST44B), TryWait.SRC (ST45), and Attached.SRC (ST48) are taken.

The switching condition SN indicating whether or not to switch the Port Power Role of the own device to SNK only can be determined based on the difference between the state transition paths leading to Attached.SRC (ST48).

Figure 20:
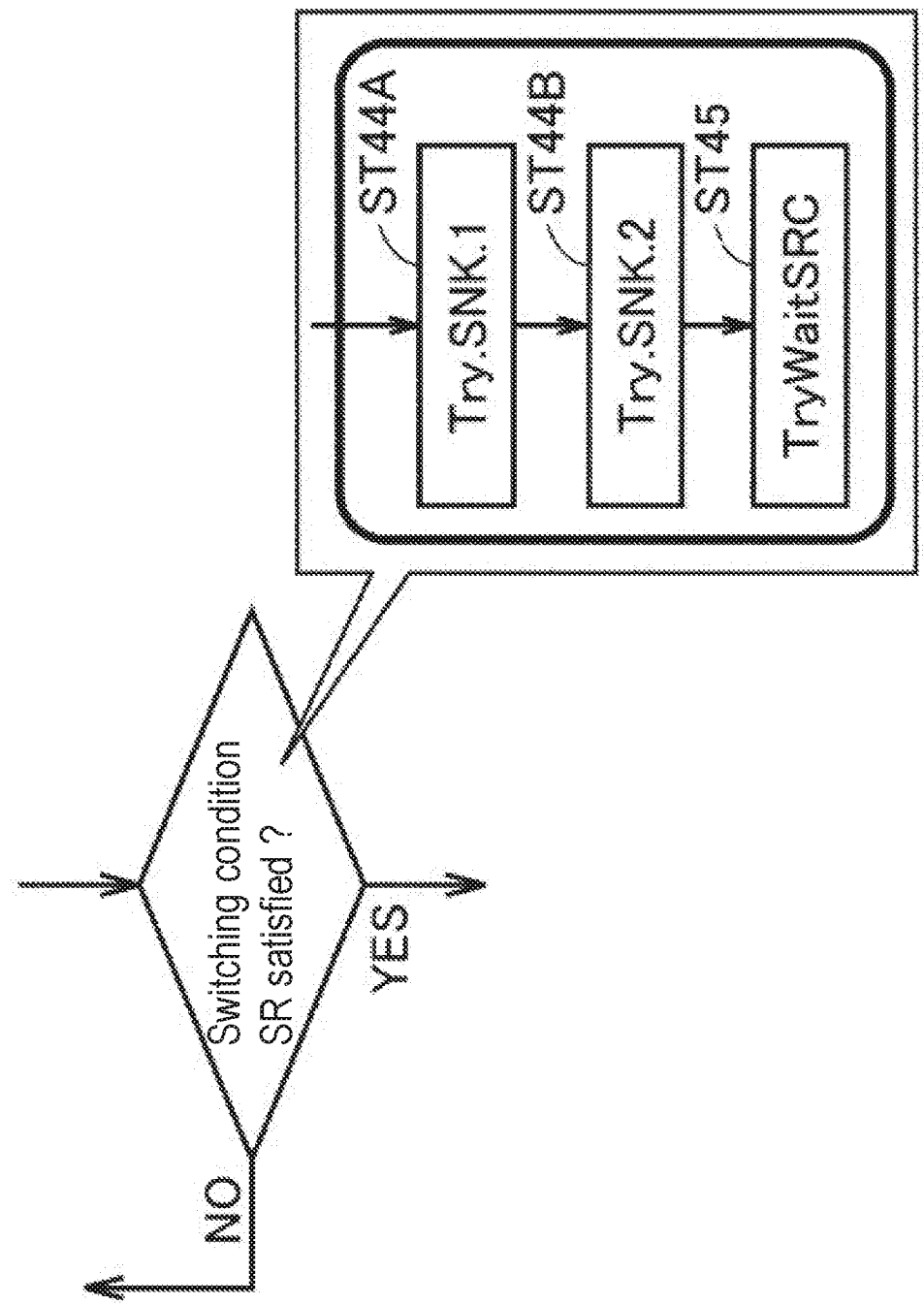
FIG. 20 is a diagram for explaining a switching condition SN employed in a device according to the fifth embodiment.

FIG. 20 is a diagram for explaining a switching condition SN employed in the device according to the fifth embodiment. Referring to FIG. 20, as the switching condition SN, first, it is determined whether or not Attached.SRC (ST48) has been reached in a predetermined state transition path. The predetermined state transition paths are Try.SNK.1 (ST44A), Try.SNK.2 (ST44B), TryWait.SRC (ST45), and Attached.SRC (ST48).

If Attached.SRC (ST48) is reached in the predetermined state transition path, the switching condition (SN) is determined to be satisfied. When it is determined that the switching condition SN is satisfied, the Port Power Role of the own device is switched to SNK only.

(h4: Summary)

According to the device according to the fifth embodiment, the Power Role of the own device can be reliably determined by SRC, even if the Port Power Role of the own device and the host opposing device, which is the device of the connection destination, are Try.SRC, which is a type of DRP. As a result, it is possible to ensure that various processes executed in association with the Power Role are executed reliably.

Except for the treatment and the configuration described above, all the points are the same as those in the first embodiment described above, and therefore, detailed description thereof will not be repeated.

I. Sixth Embodiment

The configuration described in the second embodiment described above can also be applied to the fifth embodiment. That is, when the devices according to the fifth embodiment are connected to each other, there is a possibility that the final Power Role is not determined, and in this case, when the Port Power Role is switched to SNK only, CC.Open may be passed. Thus, the opposing device determines that the Port Power Role of the own device is SNK only. This makes it possible to avoid mutual devices respectively judging that the Port Power Role of the opposing device is Try.SNK. That is, it is possible to prevent the devices according to the fifth embodiment from repeatedly switching the Port Power Role.

Except for the treatment and the configuration described above, both are the same as in the first and fifth embodiments described above, and therefore, detailed description thereof will not be repeated.

J. Seventh Embodiment

The configuration as described in the above-described the third embodiment can also be applied to the fifth embodiment. That is, a condition of "waiting for a predetermined time" may be added to the switching condition SN so as to reliably obtain a determination result of "Test Pass" in a test (Type-C Compliance Test) as to whether or not the SN conforms to the USB Type-C standard defined in the above-mentioned "Universal Serial Bus Type-C (USB Type-C) Functional Test Specification", Revision: 0.79, May 28, 2018 or the like.

More specifically, as shown in FIG. 20, if Attached.SRC (ST48) is reached by a predetermined state transition path, the switching condition (SN) may be determined to be satisfied after waiting for a predetermined period of time.

Except for the treatment and the configuration described above, both are the same as in the first and fifth embodiments described above, and therefore, detailed description thereof will not be repeated.

K. Eighth Embodiment

The configuration as described in the above-described fourth embodiment can also be applied to the fifth embodiment. That is, in order to prioritize the determination process of the Power Role Swap instruction prepared in the USB Power Delivery (PD) defined in the above-mentioned "Universal Serial Bus Power Delivery Specification", Revision: 3.0, Version: 1.2, Jun. 21, 2018 or the like, a condition "opposing device does not support PD" may be added to the switching condition SN determined in Attached.SRC (ST48). Since the specific processing procedure of the switching condition SN is the same as that of the switching condition SR shown in FIG. 15, detailed description thereof will not be repeated.

By employing the switching condition SR according to the eighth embodiment, it is possible to obtain the determination result of "Test Pass" in the Type-C Compliance Test even when the devices having the functions shown in the fifth and sixth embodiments support PD.

Except for the treatment and the configuration described above, both are the same as in the first and fifth embodiments described above, and therefore, detailed description thereof will not be repeated.

In the device according to the eighth embodiment described above, the device may judge whether the switching condition SN is satisfied or not based on the response from the opposing device so that the device can uniquely determine the scheduled Power Role regardless of the Power Role Swap policy of the opposing device. Since the specific processing procedure of the switching condition SN is the same as that of the switching condition SN shown in FIG. 16, detailed description thereof will not be repeated.

By adopting the switching condition SR according to the modification SR of the eighth embodiment, when the devices having the functions shown in the fifth and sixth embodiments support PD, the scheduled Power Role can be uniquely determined regardless of the Power Role Swap policy of the opposing device.

Except for the treatment and the configuration described above, both are the same as in the first and fifth embodiments described above, and therefore, detailed description thereof will not be repeated.

M. Ninth Embodiment

The first to fourth embodiments and modification described above may be suitably combined with one another or any modifications may be made. Similarly, the above-mentioned fifth to eighth embodiments and the modification can be combined with each other as appropriate, or arbitrary modifications can be made.

N. Tenth Embodiment

In the first to eighth embodiments and the modification described above, the processor 112 executes the firmware 114, thereby realizing the execution of the processing and the provision of the functions relating to the controller 110 as described above.

The firmware 114 executed by the processor 112 is a control program and can be installed or updated from the outside. Firmware 114 may, for example, be distributed as stored in a non-transient (non-transitory) recording medium and installed or updated (updated) to a storage area within the controller 110. As the non-temporary recording medium, an optical recording medium such as an optical disk, a semiconductor recording medium such as a flash memory, a magnetic recording medium such as a hard disk or a storage tape, or a magneto-optical recording medium such as an MO (Magneto-Optical disk) may be used. That is, the present embodiment may also include a computer-readable control program for realizing the treatment and functions as described above, and a recording medium storing the control program.

Alternatively, the firmware 114 may be downloaded from a server device via the Internet or an intranet.

Those skilled in the art will design a controller and a device including the controller according to the present embodiment by appropriately using a technique according to an age in which the present embodiment is implemented.

O. Eleventh Embodiment

In the first to eighth embodiments and the modification described above, the processor 112 executes the firmware 114, thereby realizing the execution of the processing and the provision of the functions relating to the controller 110 as described above. However, some or all of the software may be implemented in hardware instead of such software implementation. For hardware-mounting, hard-wired devices such as ASIC (Application Specific Integrated Circuit) and FPGA (Field-Programmable Gate Array) may be employed.

Those skilled in the art will design a controller and a device including the controller according to the present embodiment by appropriately using a technique according to an age in which the present embodiment is implemented.

According to the present embodiment, it is possible to solve a new problem that when devices that are Try.SRC according to the USB Type-C standard or devices that are Try.SNK according to the USB Type-C standard are connected to each other, the Power Role is not determined for either SRC or SNK.

Although the invention made by the present inventor has been specifically described based on the embodiment, the present invention is not limited to the above embodiment, and it is needless to say that various modifications can be made without departing from the gist thereof.

What is claimed is:

1. A controller for controlling an own device that supports a DRP (Dual Role Power) in which a power role of the own device after connecting to an opposing device can be switched between a power supply side (SRC) and a power reception side (SNK) according to a USB (Universal Serial Bus) Type-C standard, wherein the controller is configured to:

upon detecting a connection between the own device and the opposing device, determine that a power role of the own device is the power reception side (SNK);

when the power role of the own device is determined to be the power reception side (SNK), execute a first process of determining whether a port power role of the opposing device is Try.SRC; and when the port power role of the opposing device is determined to be Try.SRC, execute a second process of setting a port power role of the own device to SRC Only to execute a sequence between the own device and the opposing device.

2. The controller according to claim 1, wherein the second process includes a third process of opening a communication line between the own device and the opposing device to electrically connect the own device to the opposing device.

3. The controller according to claim 1, wherein the first process includes a fourth process of determining whether the port power role of the opposing device is Try.SRC based on a state transition path taken by the own device until the power role of the own device is determined to be SNK.

4. The controller according to claim 3, wherein the state transition path taken by the own device until the power role of the own device is determined to be SNK includes Attached.SRC, TryWait.SNK, and Attached.SNK in a mentioned order.

5. The controller according to claim 1, wherein the first process includes waiting for a predetermined period of time after the port power role of the opposing device is determined to be Try.SRC.

6. The controller according to claim 1,
wherein the first process comprises a fifth process of determining whether the opposing device supports USB Power Delivery, and
wherein the controller performs the second process when the opposing device is determined to not support USB Power Delivery in the fifth process.

7. The controller according to claim 6,
wherein the first process includes 1) a sixth process of transmitting a power role swap request to the opposing device and 2) a seventh process of determining whether to receive a reject from the opposing device, and
wherein the controller executes the second process upon receiving the reject from the opposing device.

8. A non-transitory, computer readable medium storing a control program that, when executed by a processor of a controller for controlling an own device that supports a DRP (Dual Role Power) in which a power role of the own device after connecting to an opposing device can be switched between a power supply side (SRC) and a power reception side (SNK) according to a USB (Universal Serial Bus) Type-C standard, causes the processor to perform operations comprising:

upon detecting a connection between the own device and the opposing device, determining that a power role of the own device is the power reception side (SNK);

when the power role of the own device is determined to be the power reception side (SNK), determining whether a port power role of the opposing device is Try.SRC based on a state transition path taken by the own device until the power role of the own device is determined to be SNK includes Attached.SRC, TryWait.SNK, and Attached.SNK in a mentioned order; and when the port power role of the opposing device is determined to be Try.SRC, setting a port power role of the own device to SRC Only to execute a sequence between the own device and the opposing device.

* * * * *